United States Patent
Ma et al.

(10) Patent No.: US 9,054,760 B2
(45) Date of Patent: Jun. 9, 2015

(54) WIRELESS DATA TRANSMISSION INCLUDING ASSIST SIGNALS

(71) Applicant: InterDigital Patent Holdings, Inc., Wilmington, DE (US)

(72) Inventors: Liangping Ma, San Diego, CA (US); Weimin Liu, Chatham, NJ (US); Ariela Zeira, Huntington, NY (US); Robert A. DiFazio, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 282 days.

(21) Appl. No.: 13/622,145

(22) Filed: Sep. 18, 2012

(65) Prior Publication Data
US 2013/0079045 A1    Mar. 28, 2013

Related U.S. Application Data

(60) Provisional application No. 61/538,917, filed on Sep. 25, 2011.

(51) Int. Cl.
*H04W 72/04* (2009.01)
*H04B 7/06* (2006.01)
(Continued)

(52) U.S. Cl.
CPC ............. *H04B 7/0617* (2013.01); *H04W 16/14* (2013.01); *H04B 7/0456* (2013.01); *H04B 7/0626* (2013.01); *H04B 7/086* (2013.01); *H04W 52/16* (2013.01)

(58) Field of Classification Search
CPC .. H04B 7/0456; H04B 7/0617; H04B 7/0626; H04B 7/086; H04B 7/046; H04B 7/0478; H04B 7/0482; H04B 7/0486; H04B 7/063; H04B 7/0632; H04B 7/0862; H04W 16/14; H04W 52/16

USPC ............ 455/509, 501, 73, 63.1, 67.11, 67.13, 455/452.1, 451, 450, 522, 69, 135, 222, 455/226.3, 283; 375/346, 267, 285, 233, 375/341

See application file for complete search history.

(56) References Cited

U.S. PATENT DOCUMENTS 5,414,734 A * 5/1995 Marchetto et al. ............. 375/267
5,513,215 A * 4/1996 Marchetto et al. ............. 375/233
(Continued)

OTHER PUBLICATIONS

"Cell phone signal boosters", Blue Spinach Marketing, webpage http://www.bsm.co.za/repeaters.htm printed Sep. 21, 2011, 3 pages.
(Continued)

*Primary Examiner* — Tan Trinh
(74) *Attorney, Agent, or Firm* — Julian F. Santos

(57) ABSTRACT

Methods, systems and apparatuses for dynamic spectrum access by both primary users (PUs) and secondary users (SUs) are disclosed. In one embodiment, a method for communicating over a channel may include obtaining, at a secondary transmitter, first and second signals intended for a primary receiver and secondary receivers, respectively; generating, at the secondary transmitter, an assist signal based, at least in part, on the obtained first signal; generating, at the secondary transmitter, a data signal based, at least in part, on the obtained second signal; determining, at the secondary transmitter, a power split ratio between the data signal and the assist signal based, at least in part, on any of a power and a signal-to-noise ratio of the first signal; and generating, at the secondary transmitter, a third signal comprising (i) the data signal and (ii) the assist signal in accordance with power split ratio.

35 Claims, 15 Drawing Sheets

(51) Int. Cl.
*H04W 16/14* (2009.01)
*H04B 7/04* (2006.01)
*H04B 7/08* (2006.01)
*H04W 52/16* (2009.01)

(56) References Cited

U.S. PATENT DOCUMENTS

| | | | |
|---|---|---|---|
| 6,125,150 A | | 9/2000 | Wesel et al. |
| 2003/0086515 A1* | | 5/2003 | Trans et al. ............... 375/346 |
| 2008/0160927 A1* | | 7/2008 | Bar-Ness et al. ............ 455/73 |
| 2012/0034874 A1* | | 2/2012 | Yiu et al. ................... 455/63.1 |
| 2013/0029706 A1* | | 1/2013 | Sachs et al. ................ 455/501 |

OTHER PUBLICATIONS

"Cellular Signal Boosters", Wilson Electronics Inc., webpage http://web.archive.org/web/20110722093915/http://www.wilsonelectronics.com/ printed Sep. 21, 2011, 4 pages.

"Huaptec Triple Band Repeater", Shenzhen HUAPTEC Co., Ltd, webpage http://www.huaptec.com/Triple_Band_repeater_S10-TB_S15-TB_S20-TB_10dBm_-_20dBm.html#mm printed Sep. 21, 2011, 7 pages.

"Multi Carrier Power Amplifier", Commscope, webpage http://www.commscope.com/andrew/eng/product/bss/carrier_amplifier/index.html printed Sep. 21, 2011, 2 pages.

Akyildiz, Ian F., et al., "CRAHNs: Cognitive radio ad hoc networks", Ad Hoc Networks, vol. 7, (2009), 27 pages.

Costa, Max H., "Writing on Dirty Paper", IEEE Transactions on Information Theory, vol. IT-29, No. 3, May 1983, 3 pages.

Goldsmith, Andrea, et al., "Breaking Spectrum Gridlock with Cognitive Radios: An Information Theoretic Perspective", Proceedings of the IEEE, vol. 97, No. 5, May 2009, 21 pages.

Harashima, Hiroshi, et al., "Matched-Transmission Technique for Channels with Intersymbol Interference", IEEE Transactions on Communications, vol. Com-20, No. 4, Aug. 1972, 7 pages.

Jain, Mayank, et al., "Practical, Real-time, Full Duplex Wireless", MobiCom, Las Vegas, Nevada. Sep. 2011, 12 pages.

Jovicic, Aleksandar, et al., "Cognitive Radio: An Information-Theoretic Perspective", IEEE Transactions on Information Theory, vol. 55, No. 9, Sep. 2009, 14 pages.

Ma, Liangping, et al., "CONI: Credit-based Overlay and Interweave Dynamic Spectrum Access Protocol for Multi-hop Cognitive Radio Networks", IEEE Globecom, Houston, TX, Dec. 2011, 6 pages.

Mazo, J.E., "Exact Matched Filter Bound for Two-Beam Rayleigh Fading", IEEE Transactions on Communications, vol. 39, No. 7, Jul. 1991, 4 pages.

Mitran, P., et al., "Space-time Diversity Enhancements Using Collaborative Communications", IEEE Transactions on Information Theory, vol. 51, No. 6, Jun. 2005, 17 pages.

Sachs, Joachim, et al., "Cognitive Cellular Systems within the TV Spectrum", IEEE DySPAN, Singapore, Apr. 2010, 12 pages.

Seshadri, N., et al., "Two Signaling Schemes for Improving the Error Performance of Frequency-Division-Duplex (FDD) Transmission Systems Using Transmitter Antenna Diversity", IEEE, 0-7803-1266-x/93, 1993, 4 pages.

Tomlinson, M., "New Automatic Equaliser Employing Modulo Arithmetic", Electronic Letters, vol. 7, No. 5/6, Mar. 25, 1971, 2 pages.

\* cited by examiner

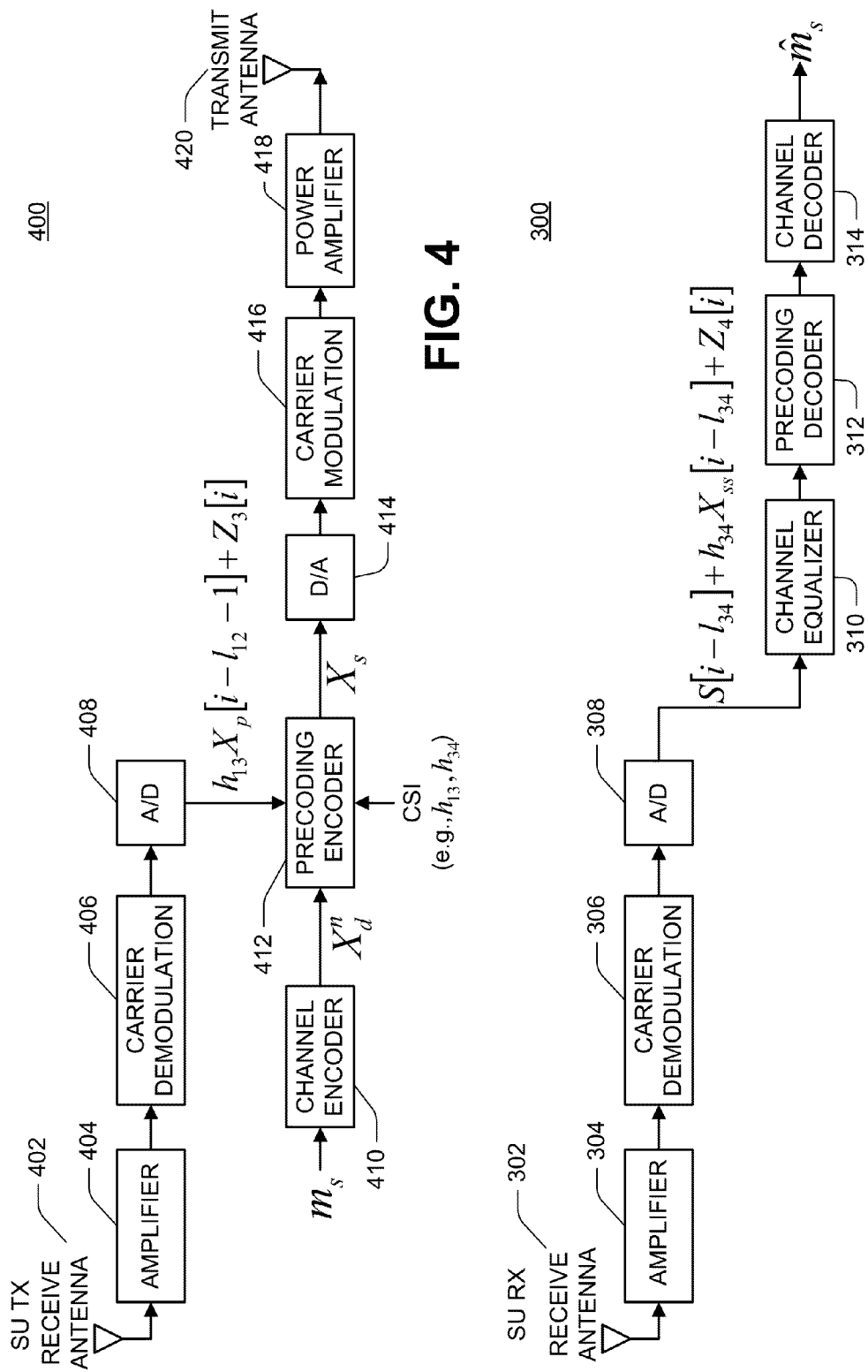

WIRELESS DATA TRANSMISSION INCLUDING ASSIST SIGNALS

CROSS REFERENCE TO RELATED APPLICATIONS

This application claims the benefit of U.S. Provisional Application Ser. No. 61/538,917 filed Sep. 25, 2011, which is incorporated by reference in its entirety.

BACKGROUND

1. Field

This application is related to wireless communications.

2. Related Art

Current dynamic spectrum access approaches include an interweave approach. In the current interweave approach, primary users (PUs) of the spectrum are free to use the spectrum. Secondary users (SUs) of the spectrum, however, are not permitted to use the spectrum when in use by the PUs, but rather access "spectrum holes" opportunistically. That is, the SUs may transmit when the PUs are not using the spectrum.

SUMMARY

Methods, systems and apparatuses for dynamic spectrum access by both primary users (PUs) and secondary users (SUs) are disclosed. In an embodiment, a method for communicating over a channel may include obtaining, at a secondary transmitter, first and second signals intended for primary and secondary receivers, respectively; generating, at the secondary transmitter, a data signal based, at least in part, on the obtained second signal; generating, at the secondary transmitter, an assist signal based, at least in part, on the obtained first signal; determining, at the secondary transmitter, a power split ratio between the data signal and the assist signal based, at least in part, on any of a power and a signal-to-noise ratio of the first signal; and generating, at the secondary transmitter, a third signal comprising (i) the data signal and (ii) the assist signal in accordance with power split ratio.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 3 is a block diagram illustrating an example secondary receiver;

FIG. 4 is a block diagram illustrating an example secondary transmitter;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples disclosed herein.

Overview

The methods, systems and apparatuses for dynamic spectrum access by both PUs and SUs herein may provide for an overlay data transmission from a transmitter of a SU ("secondary transmitter") to a receiver of a SU ("secondary receiver") by the inclusion of an assist signal within the transmission from the secondary transmitter. The assist signal sent by the secondary transmitter aids reception of a PU signal that originates at and/or from a primary transmitter. In some embodiments, the assist signal is generated from or based, at least in part, on the PU signal transmitted by the primary transmitter and received wirelessly at the secondary transmitter. The secondary transmitter in some embodiments may calculate a power split ratio to apply to the assist signal versus the secondary transmitter's data signal intended for the secondary transmitter. In some embodiments, the secondary transmitter may precode the signal (including discrete-time signal or symbol, and continuous-time signal) of its secondary data signal so that when the competing signals are received at the secondary receiver, the combined signals are a modulo extension of the intended secondary data signal. The secondary receiver may then perform a modulo reduction to obtain the intended secondary data signal. In some embodiments the precoding may be based on the assist signal.

Example Architecture

Figure 1:
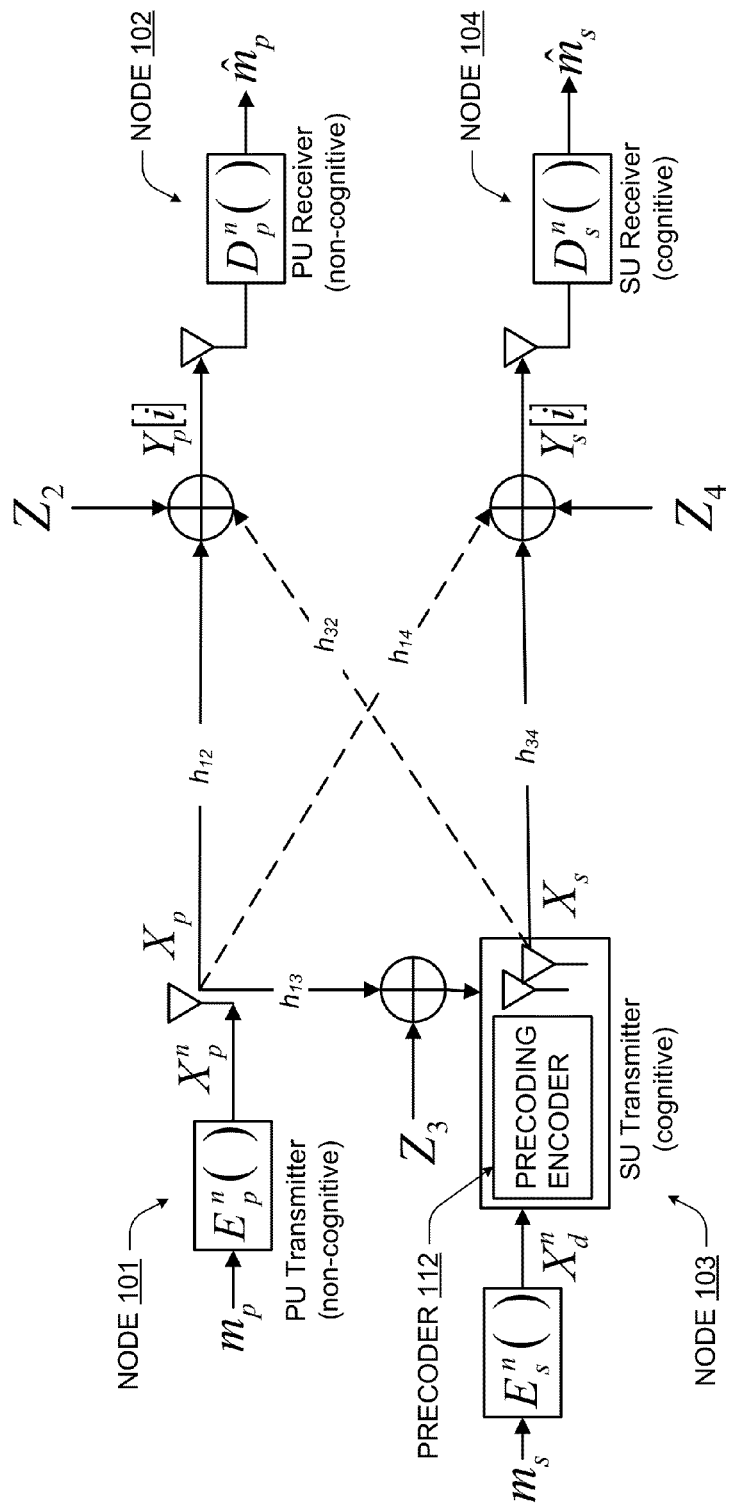
FIG. 1 is a block diagram illustrating an example of a communications system in which one or more disclosed embodiments may be implemented and/or carried out.

FIG. 1 is a block diagram illustrating an architecture of an example of a communications system 100 in which one or more disclosed embodiments may be implemented and/or carried out. The communications system 100 may include four nodes, namely, node 101, node 102, node 103 and node 104. Each of the nodes 101-104 may be adapted and/or configured (collectively "adapted") to simultaneously access and use a given (i.e., the same) wireless spectrum. The nodes 101 and 102 may be designated as primary users (PU(s)) of the wireless spectrum, and the nodes 103 and 104 may be designated as secondary users (SU(s)) of the wireless spectrum. The nodes 101 and 102 may be, for example, nodes of a digital television (DTV) or other wireless (e.g., cellular and/or Wi-Fi) communication network and/or system (collectively "PU network"). Each of the nodes 101 and 102 may include any of a transmitter, receiver or a combination thereof (e.g., a transceiver) along with other elements, including, for example, a processor in communication with the transmitter, receiver or combination thereof.

The nodes 103 and 104 may be, for example nodes of another wireless (e.g., cellular and/or Wi-Fi) communication system and/or network (collectively "SU network"). Each of the node 103 and 104 may include any of a transmitter, receiver or a combination thereof (e.g., a transceiver) along with other elements, including, for example, a processor in communication with the transmitter, receiver or combination thereof. Details of a communication system 1100, which may be representative of the PU network, SU network and/or the communication system 100, are provided below with reference to FIGS. 12A-12E.

As shown in FIG. 1, the nodes 101 and 102 may be non-cognitive radios, and the nodes 103 and 104 may be cognitive radios. The node 101 may be adapted to operate as a transmitter (hereinafter "primary transmitter 101"), and the node 102 may be adapted to operate as a receiver (hereinafter "primary receiver 102"). The node 103 may be adapted to operate as a transmitter (hereinafter "secondary transmitter 103"), and the node 104 may be adapted to operate as a receiver (hereinafter "secondary receiver 104").

The methods, systems and apparatuses for dynamic spectrum access by both PUs and SUs herein may provide for an overlay data transmission from the secondary transmitter 103 to the secondary receiver 104 by the inclusion of an assist signal within the transmission from the secondary transmitter 103. The assist signal sent by the secondary transmitter 103 may aid reception by the primary receiver 102 of a PU signal that originates at and/or from the primary transmitter 101. In some embodiments, the assist signal may be generated from or based, at least in part, on the PU signal transmitted by the primary transmitter 101 and received wirelessly at the secondary transmitter 103. The secondary transmitter 103, in some embodiments, may calculate a power split ratio to apply to the assist signal versus the secondary transmitter's data signal intended for the secondary transmitter 104. In some embodiments, the secondary transmitter 103 may precode the signal (including discrete-time signal or symbol, and continuous-time signal) of its secondary data signal so that when competing signals are received at the secondary receiver 104, the combined signals are a modulo extension of the intended secondary data signal. The secondary receiver 104 may then perform a modulo reduction to obtain the intended secondary data signal. In some embodiments the precoding may be based on the assist signal.

In general, the secondary transmitter 103 may transmit messages ("SU-messages") to the secondary receiver 104 not only by accessing spectrum holes opportunistically, but also using the same wireless spectrum (e.g., the same frequency and timing resources) that the primary transmitter 101 uses to transmit messages ("PU-messages") to the primary receiver 102. With respect to the latter, a signal ("SU-signal") transmitted from the secondary transmitter 103 during a transmission of a signal ("PU-signal") from the primary transmitter 101 may overlay such PU-signal. Notwithstanding its use of the same wireless spectrum, the secondary transmitter 103 (as a SU) may transmit the SU-signal and satisfy conditions for coexistence with the PUs ("coexistence conditions"), namely, (i) the SU-signal does not (or at least not significantly) degrade the PU-signal received at the primary receiver 102, and (ii) the primary receiver 102 may use the same decoder it would use in absence of the SU-signal. Additionally, the transmission of the SU-signal may improve the quality (e.g., signal-to-noise ratio (SNR)) of the primary signal received at the primary receiver 102. To facilitate the foregoing, the secondary transmitter 103 may split its transmission power into a plurality of parts. These parts may include one part for the secondary transmitter 103 to transmit its own SU-message, and another part to assist the transmission of a PU-message.

Referring to FIG. 1, the primary transmitter 101 may be adapted to obtain a PU-message, $m_p$, intended for the primary receiver 102. This PU-message, $m_p$, may be and/or include any type of content, and may be obtained by generating it or receiving it from a given source ("primary-msg source"), such as, for example, a provider of DTV ("DTV provider"). The primary transmitter 101 may obtain the PU-message, $m_p$, in response to a request or otherwise.

The primary transmitter 101 may include a channel encoder, $E_p^n(\ )$. The channel encoder, $E_p^n(\ )$ may be used to encode the PU-message, $m_p$, to form codeword ("PU-message codeword"), $X_p^n(m_p)$. The PU-message codeword, $X_p^n(m_p)$, may be a vector of length n. The primary transmitter 101 may also include an antenna and various other elements (not shown) commonly found in wireless radios. For example, the primary transmitter may include any of a filter, digital-to-analog converter (D/A), modulator and power amplifier, etc. One or more of these elements may be used for converting the PU-message message codeword, $X_p^n(m_p)$, into a PU-signal, $X_p$; and to transmit the PU-signal, $X_p$, from its antenna into channel 110.

Although the channel encoder, $E_p^n(\ )$, is shown as included within the primary transmitter 101, the channel encoder, $E_p^n(\ )$, may be disposed in another element (not shown). In which case, the primary transmitter 101 may be adapted to obtain the PU-message codeword, $X_p^n(m_p)$, in whole or in part (e.g., on a symbol-by-symbol or multiple symbol basis).

The secondary transmitter 103 may be adapted to obtain an SU-message, $m_s$, intended for the secondary receiver 104. The SU-message, $m_s$, may be and/or include any type of content, and may be obtained by generating it or receiving it from a given source ("secondary-msg source"), such as for example, one or more nodes of and/or providers to the SU network. The secondary transmitter 103 may obtain the SU-message, $m_s$, in response to a request or otherwise.

The secondary transmitter 103 may include a channel encoder, $E_s^n(\ )$. The channel encoder, $E_x^n(\ )$, may be used to encode the SU-message, $m_s$, to form codeword ("SU-message codeword"), $X_d^n(m_s)$. The channel encoder, $E_s^n(\ )$, is shown as included within the secondary transmitter 103. As an alternative, the channel encoder, $E_s^n(\ )$ may be disposed in another element (not shown), and as such, the secondary transmitter 103 may be adapted to obtain the SU-message codeword, $X_s^n(m_s)$, in whole or in part, instead.

The secondary transmitter 103 may also be adapted to obtain any of the PU-message, $m_p$, the PU-message codeword, $X_p''(m_p)$, and/or symbols of the PU-message codeword, $X_p''(m_p)$ (hereinafter "PU-codeword symbols"). As described in more detail below, the secondary transmitter 103 may, for example, have causal knowledge of any of the PU-message, $m_p$, the PU-message codeword, $X_p''(m_p)$, and/or PU-codeword symbols. The secondary transmitter 103 may, for example, obtain causal knowledge from a transmission of the PU-signal, $X_p$. Of course, it is understood that in this embodiment, the secondary transmitter 103 includes a receiver functionality to receive the transmission of the primary signal, or PU-codeword symbols, and therefore may be generally characterized as a transceiver. The secondary transmitter 103 may obtain any of the PU-message, $m_p$, the PU-message codeword, $X_p''(m_p)$, and/or PU-codeword symbols in other ways (e.g., from a relay disposed within the channel 110 (not shown)), as well.

The secondary transmitter 102 may also include a precoding encoder ("precoder") 112. The precoder 112 may be adapted to generate a data signal. The precoder 112 may, for example, generate the data signal based, at least, in part on a symbol obtained from the SU-message codeword, $X_d''(m_s)$ (hereinafter "SU-codeword symbol"). The precoder 112 may also be adapted to generate an assist signal based, at least, in part on one or more of the PU-codeword symbols.

The precoder 112 may be further adapted determine a power split ratio between the data signal and the assist signal. The precoder 112 may, for example, may determine the power split ratio based, at least in part, on any of a power and a signal-to-noise ratio of the PU-signal, $X_p$, e.g., as received at the secondary transmitter 103. The precoder 112 may also be adapted to generate a SU-signal, $X_s$, that includes the data signal and the assist signal in accordance with the power split ratio. The precoder 112 may be, for example, a Tomlinson-Harashima precoder (THP). Alternatively, the precoder 112 may be a precoder that is adapted to generate the data signal identical to or a scaled version of the SU-codeword symbol.

The secondary transmitter 103 may also include an antenna and various other elements (not shown). These elements may include, for example, a modulator adapted to, for example, modulate the SU-signal, $X_s$, on a carrier; and one or more power amplifiers adapted to, for example, transmit the SU-signal, $X_s$, from its antenna into the channel 110 (e.g., towards the primary and secondary receivers).

The primary and secondary receivers 102, 104, may include respective antennas and decoders, $D_p''()$, $D_s''()$. The primary-receiver decoder, $D_p''()$, may be adapted to decode a signal ("PU-received signal"), $Y_p$, received at the primary-receiver antenna, and obtain an estimate ("PU-message estimate"), $\hat{m}_p$, for the PU-message, $m_p$. The secondary-receiver decoder, $D_s''()$, may be adapted to decode a signal ("SU-received signal"), $Y_s$, received at the secondary-receiver antenna, and obtain an estimate ("SU-message estimate"), $\hat{m}_s$, for the SU-message, $m_s$.

The secondary receiver 104 may also be adapted to feedback channel state information (CSI) to the secondary transmitter 103. The CSI may be and/or include a channel impulse response. The channel impulse response may include, for example, estimates of channel gains ("channel-gain estimates") $h_{14}$ and $h_{34}$. Although not fed back to the secondary transmitter 103 from the secondary receiver 104, channel-gain estimates, $h_{12}$ and $h_{32}$, may be fed back to the primary transmitter 101 from the primary receiver 102. In one embodiment, the channel-gain estimates, $h_{12}$ and $h_{32}$, may then be communicated to the secondary transmitter 103 from, for example, the primary transmitter 101 or other node (not shown). The channel gain may be and/or modeled as, for example, circular Gaussian (denoted as $h_{ij} \sim CN(0, \sigma_{ij}^2)$, i, j= 1, ..., 4).

As shown, each of the primary receiver 103, secondary transmitter 103 and secondary receiver 104 are susceptible to channel noise (denoted as $Z_i \sim CN(0, N_i)$, i=2, 3 and 4). The noise $Z_2$, $Z_3$ and $Z_4$ may be, for example, additive Gaussian with mean zero and variances, $N_2$, $N_3$ and $N_4$, respectively.

Figure 2:
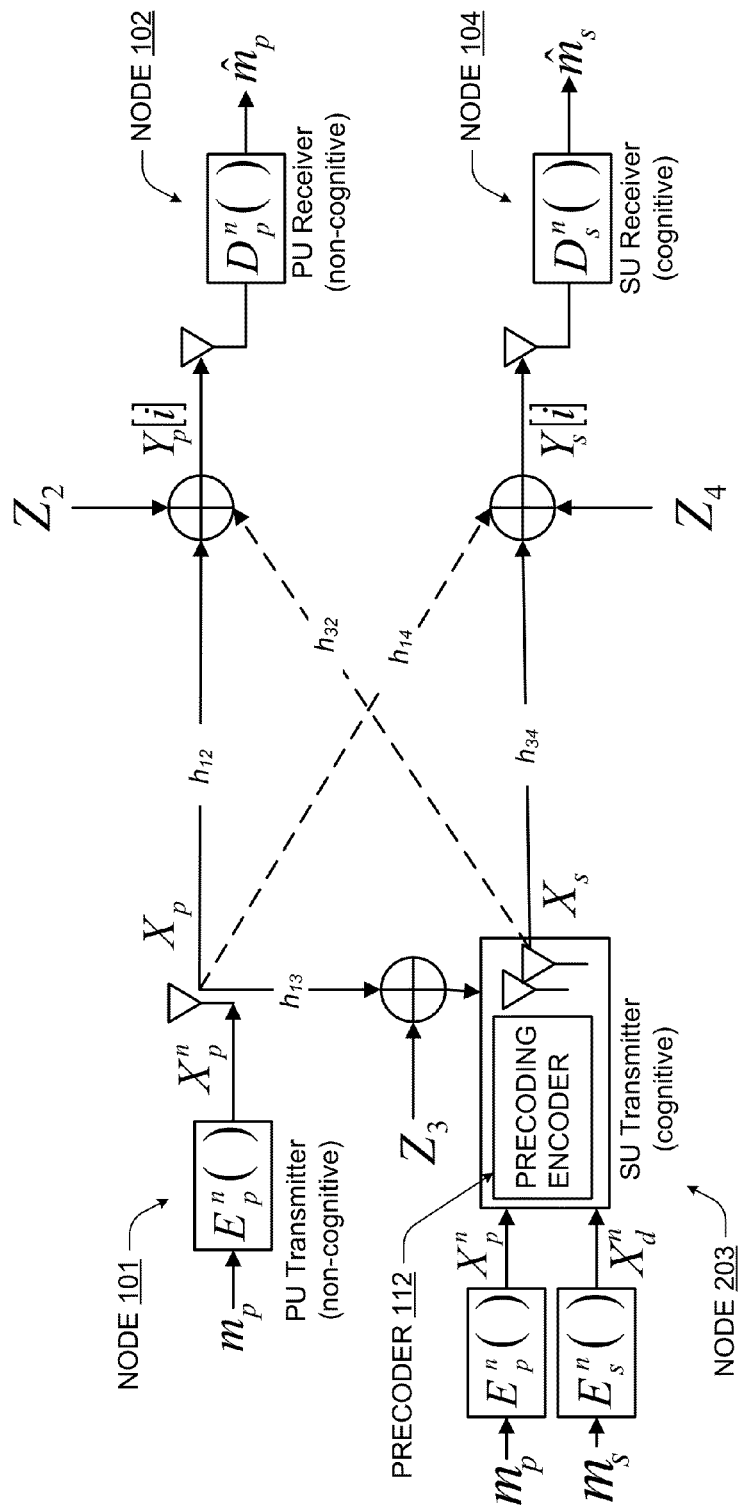
FIG. 2 is a block diagram illustrating an example of a communications system in which one or more disclosed embodiments may be implemented and/or carried out.

Referring now to FIG. 2, a block diagram illustrating an architecture of an example of a communications network 200 in which one or more disclosed embodiments may be implemented and/or carried out is shown. The communications network 200 of FIG. 2 is similar to the communications network 100 of FIG. 1, except that secondary transmitter 203 is adapted to obtain a copy of the PU-message, $m_p$. The secondary transmitter 203 may obtain the copy of the PU-message, $m_p$, from, for example, the primary-msg source, at the same time as or before the PU-message, $m_p$, is received at (or transmitted from) the primary transmitter 101. Alternatively, the secondary transmitter 203 may obtain the copy of the PU-message, $m_p$, within a fraction of a symbol interval after the PU-signal, $X_p$, is transmitted from the primary transmitter 101. As shown, the secondary transmitter 203 may include two channel encoders, namely, a channel encoder, $E_s''()$, and a channel encoder $E_p''()$. The channel encoder, $E_s''()$ may be, for example, the same as described above with respect to FIG. 1. The channel encoder, $E_p''()$, may be adapted to encode the PU-message, $m_p$, in the same way as the channel encoder, $E_p''()$ of the primary transmitter 101. The channel encoder, $E_p''()$, of the secondary transmitter 203 may encode the copy of the PU-message, $m_p$, in other ways, as well.

Although the channel encoder, $E_p''()$ the secondary transmitter 203 is shown as included within the secondary transmitter 203, the channel encoder, $E_p''()$, may be disposed in another element (not shown). In such case, the secondary transmitter 203 may be adapted to obtain a copy of the PU-message codeword, $C_p''(m_p)$, or a copy of the PU-codeword symbol, instead. The secondary transmitter 203 may obtain the copy of the PU-message codeword, $X_p''(m_p)$, or the PU-codeword symbol from, for example, the primary-msg source, and may receive the same at the same time as or before the PU-signal, $X_p$, is transmitted from the primary transmitter 101. Alternatively, the secondary transmitter 203 may obtain the copy of the PU-message codeword, $X_p''(m_p)$, or the PU-codeword symbol after the PU-signal, $X_p$, is transmitted from the primary transmitter 101.

FIG. 3 is a block diagram illustrating an example secondary receiver 300. The secondary receiver 300 of FIG. 3 is similar to the secondary receivers 104 of FIGS. 1 and 2. The secondary receiver 300 of FIG. 3 may include a receive antenna 302, an amplifier 304, a demodulator 306, an analog-to-digital converter (A/D) 308, a channel equalizer 310, a precoding decoder 312 and a channel decoder 314. The channel decoder 312 may be, for example, the channel decoder, $D_s''()$. The secondary receiver 300 of FIG. 3 may include other elements (e.g. filters, etc.), as well.

FIG. 4 is a block diagram illustrating an example secondary transmitter 400. The secondary transmitter 400 of FIG. 4 is similar to the secondary transmitters 103 and 203 of FIGS. 1 and 2, respectively. The secondary transmitter 400 of FIG. 4 may be, for example, a full duplex radio. The secondary transmitter 400 may include a receive antenna 402, a first amplifier 404, a demodulator 406, an analog-to-digital converter (A/D) 408, a channel encoder 410, a precoder 412, a D/A 414, a modulator 416, a second amplifier 418 and a transmit antenna 420. Details of a full duplex radio that may be modified in accordance with the teachings herein may be found in M. Jainy, et al., "Practical, Real-Time, Full Duplex Wireless," *MobiCom*, Las Vegas, Nev., September 2011, which is incorporated herein by reference.

The channel encoder 410 may be, for example, the channel encoder, $E_s^n(\ )$. The precoder 412 may be the precoder described above with respect to FIGS. 1 and 2 and/or as described herein below. The secondary transmitter 400 of FIG. 4 may include other elements (e.g. filters, etc.), as well.

Figure 5:
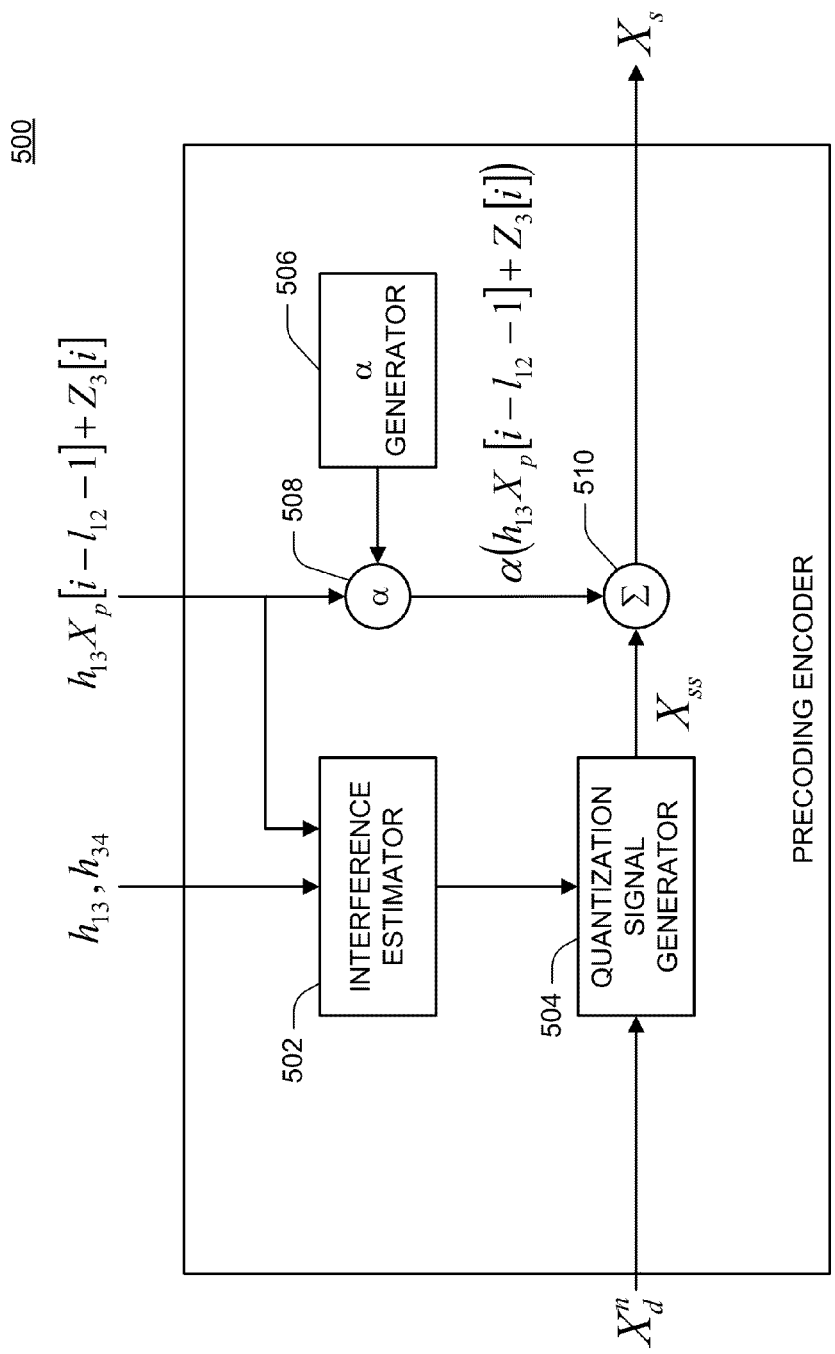
FIG. 5 is a block diagram illustrating an example of a Tomlinson-Harashima precoder.

FIG. 5 is a block diagram illustrating an example of a THP 500. This THP 500 may be used as the precoder of a secondary transmitter. The THP 500 may include an interference estimator 502, a quantization signal generator 504, an a generator 506, an a scalar 508 and a summer 510. The THP 500 may include other elements as well.

In various embodiments herein, some nodes (including the nodes 103 and 104 of FIG. 1 and nodes 203, 104 of FIG. 2) may be or respectively include cognitive radios, and other nodes (including the nodes 101 and 102 of FIGS. 1 and 2) may be or respectively include non-cognitive radios. In general, a cognitive radio includes a capability to adapt its transmission signal to its operating environment (e.g., the channel 110), whereas a non-cognitive radio does not have such adaptation capability. As an example, the secondary transmitter 103 (or the cognitive radio thereof) may adapt its transmission signal to a transmission signal of the PU. For instance, with reference to FIG. 1, when the PU-signal, $X_p$, transmitted from the primary transmitter 101 changes, the secondary transmitter 103 may adapt its precoding scheme accordingly, as the PU-signal, $X_p$, may be an input to the precoder 112.

As another example, the primary transmitter 101 and primary receiver 102 may move far away from the secondary transmitter 103 and secondary receiver 104 and another pair of PUs of a different type (not shown) may move close to the secondary transmitter 103 and secondary receiver 104. If the primary transmitter 101 and primary receiver 102 move far enough away from the the secondary transmitter 103 and secondary receiver 104 so that the latter need not consider the former when determining a transmission strategy, then, effectively, the switch to the second pair of PUs may be considered as a change from one type of PU to another. In this scenario, the secondary transmitter 103 may adapt its transmission signal to the type of PUs. To facilitate this, the secondary transmitter 103 may maintain a database (not shown) in memory (not shown). The database may store the parameters of radio signals for each type of PUs. These parameters may include, for example, any of carrier frequency, bandwidth, modulation scheme(s), and synchronization sequences (e.g., for packet synchronization).

To transmit over a channel allocated to one of the PUs (e.g., channel 110), the secondary transmitter 103 may determine the types of the PUs that operate in such channel, which may be characterized by carrier frequency and bandwidth. The secondary transmitter 103 may also attempt to synchronize with the PU of the channel. For example, the secondary transmitter 103 may try a synchronization sequence associated with each of the determined types of the PUs until synchronization is achieved or the list of determined types of the PUs is exhausted. For a given type of primary users, the synchronization sequence is typically modulated with a known scheme. If synchronization is achieved, then the secondary transmitter 103 may be able to determine which of the PUs has been detected, and extract from the database possible modulation schemes associated with the detected PUs. The secondary transmitter 103 may further detect which modulation scheme is used by the PUs. Once detected, the secondary transmitter 103 may adapts its precoding scheme to the modulation scheme used by the transmitter of the detected PUs.

Example Operation

Figure 6:
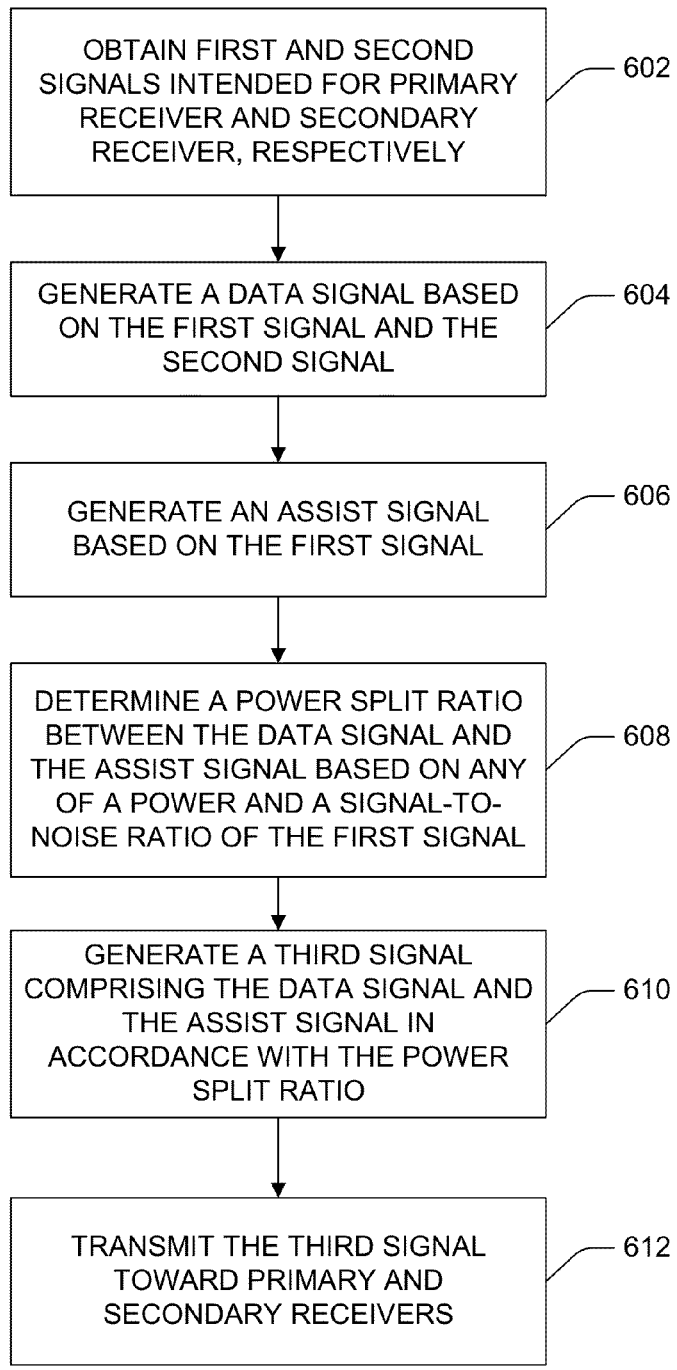
FIG. 6 is a flow chart illustrating an example flow for communicating over a channel in accordance one or more embodiments.

FIG. 6 is a flow chart illustrating an example flow 600 for communicating over a channel. For convenience, the example flow 600 is described with reference to the architecture of FIG. 1. The example flow 600 may be carried out in other architectures, as well.

The secondary transmitter 103 may obtain first and second signals intended for the primary and secondary receivers 102, 104, respectively (block 602). The first signal may be, for example, the PU-signal, $X_p$, obtained from a signal ("SU-tx PU-signal"), $h_{13}X_p+Z_3$, received from the channel 110 and transmitted from the primary transmitter 101. The second signal may be, for example, the SU-message, $m_s$.

The secondary transmitter 103 may obtain the PU-signal, $X_p$, by demodulating the SU-tx PU-signal, $h_{13}X_p+Z_3$, which includes (i) the PU-signal, $X_p$, as operated on by the channel gain, $h_{13}$, and (ii) channel noise, $Z_3$, associated with the channel 110 between the primary and secondary transmitters 101, 103. The obtained PU-signal, $X_p$, may have been formed by the primary transmitter 101. The primary transmitter 101, for example, may obtain and encode the PU-message, $m_p$, to form the PU-codeword, $X_p^n(m_p)$; and then convert the PU-message codeword, $X_p^n(m_p)$, to form the PU-signal, $X_p$. Thereafter, the primary transmitter 101 may transmit the PU-signal, $X_p$, into the channel 110 (e.g., towards the primary and secondary receivers 102, 104 and detectable by the secondary receiver 103).

After obtaining the SU-message $m_s$, the secondary transmitter may encode it to form SU-message codeword $X_d^n(m_s)$. The secondary transmitter 103 may also generate a data signal based, at least, in part on the obtained SU-message, $m_s$ (block 604). The data signal so generated may include one or more SU-codeword symbols obtained from the SU-message codeword, $X_d^n(m_s)$.

Responsive to detecting and/or obtaining a PU-codeword symbol of the SU-tx PU-signal, $h_{13}X_p+Z_3$, during demodulation, the secondary transmitter 103 may (i) generate an assist signal based, at least in part, on the PU-codeword symbol; (block 606); (ii) determine a power split ratio between the data signal and the assist signal based, at least in part, on any of the power and SNR of the SU-tx PU-signal, $h_{13}X_p+Z_3$, (block 606); and then (iii) generate the SU-signal, $X_s$ so as to include the data signal and the assist signal in accordance with the power split ratio (block 608).

After generating the SU-signal, $X_s$, the secondary receiver 103 may also transmit the SU-signal, $X_s$, into the channel 110 (e.g., towards the primary and secondary receivers). The secondary transmitter 103, for example, may transmit the SU-signal, $X_s$, so as to satisfy an equalization capability of the primary receiver 101. In one embodiment, the secondary transmitter 103 may satisfy such equalization capability by transmitting the SU-signal, $X_s$, at a delay based, at least in part, on a symbol interval of, for example, the PU-signal $X_p$. This delay may be, for example, any of an integer multiple of the symbol interval and a combination of an integer multiple of the symbol interval and a non-integer multiple of the symbol interval. The delay may also incorporate propagation delays, and processing delays at the secondary transmitter 103.

As described in more detail below, the primary receiver 102 may receive two copies of the PU-message, $m_p$: a first copy from the PU-signal, $X_p$, transmitted from the primary transmitter 101, and a second copy from the SU-signal, $X_s$, transmitted from the secondary transmitter 103. Due, in part to a difference in time between the transmissions of the PU-signal, $X_p$, and SU-signal, $X_s$, the primary receiver 102 receives the second copy (the assist signal) of the PU-message, $m_p$, at a delay of at least a demodulation delay (e.g., a delay equal to a sampling period of a corresponding baseband signal), and hence, delay diversity. An example of such delay diversity 700 is shown in FIG. 7.

Figure 7:
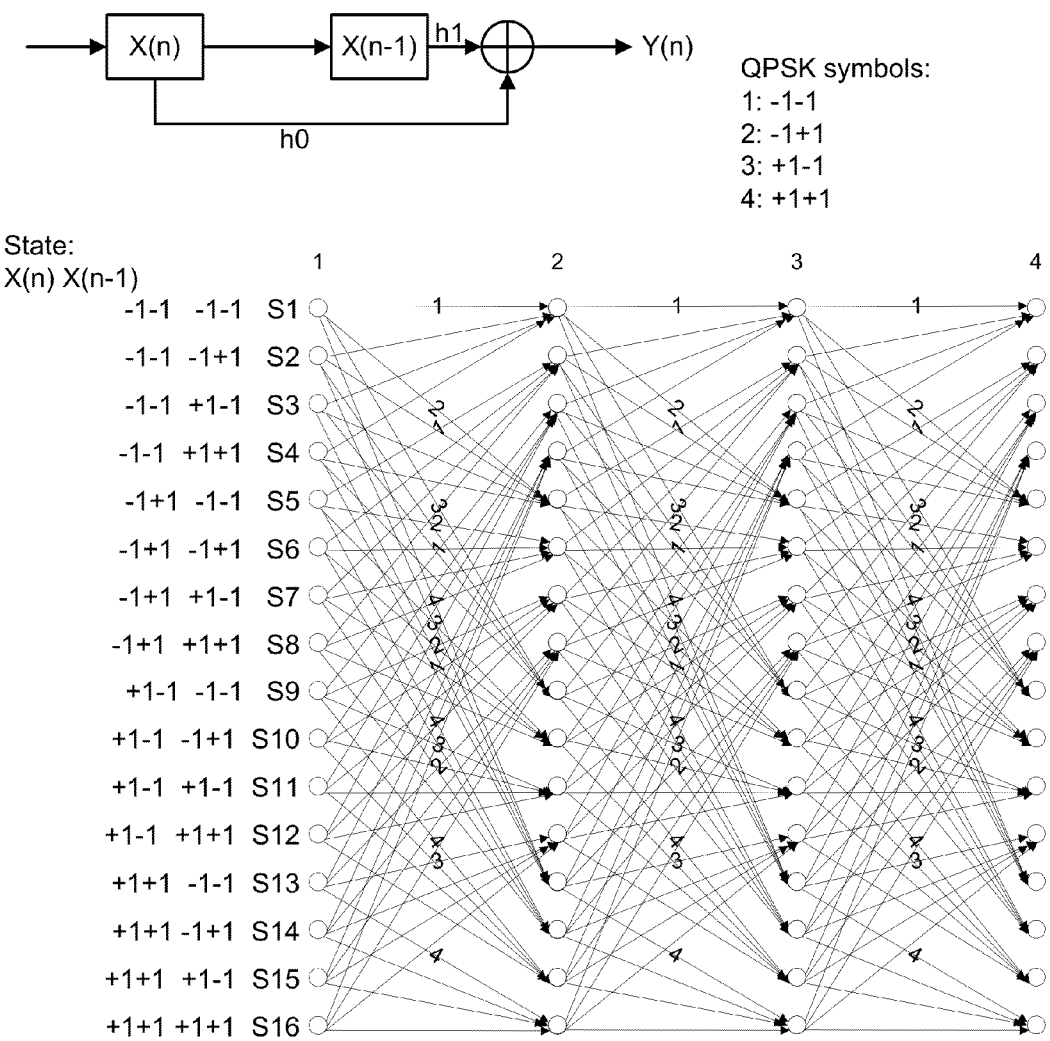
FIG. 7 is a block diagram illustrating an example of delay diversity in accordance one or more embodiments.

As shown in FIG. 7, delay spread introduces memory into signals received at different times for a channel of two taps, such as the channel 110. States S1, S2, ..., S16 are possible states of the channel 110 as seen by the primary receiver 102. The state of the channel 110 may be determined by a pair X(n)X(n−1), where X(n) is a transmitted signal at time n, and X(n−1) is a transmitted signal at time n−1. As an example, if n=1, X(n)=[−1 −1], X(n−1)=[−1 −1] and assuming Quadrature Phase Shift Keying ("QPSK"), then the expected state is of the channel 110 is state S1. While in a particular state, when a new symbol enters the channel 110 at time n=2, the state of the channel 110 will change. For example, if the current state is state S1, and the new symbol is [−1 1] (or QPSK symbol 2), then the new state of the channel will be −1 1 −1 −1, or state S5. This state transition is indicated by an outgoing vector, labeled with the number 2, originating from state S1 at time 1 to state S5 at time 2.

Referring again to FIG. 6, the secondary transmitter 103 may have non-causal knowledge of and obtain (e.g., from the primary-msg source) any of the PU-message $m_p$, PU-message codeword $X_p''(m_p)$ and PU-codeword symbols prior to the transmission of the PU-signal $X_p$ from the primary transmitter 101. Upon detecting the SU-tx PU-signal, $h_{13}X_p+Z_3$, the secondary transmitter 103 may begin to demodulate it. Responsive to detecting and/or obtaining the PU-codeword symbol of the SU-tx PU-signal, $h_{13}X_p+Z_3$, the secondary transmitter 103 may generate the SU-signal $X_s$ (block 610). To facilitate generating the SU-signal, $X_s$, secondary transmitter 103 may generate the data signal (block 604) and determine the power split ratio (block 608), as above. Additionally, the secondary transmitter 103 may generate, locally, the PU-codeword symbol obtained from the non-causal knowledge of the PU-message, $m_p$, PU-message codeword $X_p''(m_p)$ and/or PU-codeword symbols. The secondary transmitter 103 may generate the assist signal based, at least, in part on the locally-generated PU-codeword symbol obtained from the locally-generated primary-msg codeword, $X_p''(m_p)$. The secondary transmitter 103 may thereafter generate the SU-signal, $X_s$, so as to include the data signal and the assist symbol in accordance with the power split ratio (block 610). The secondary transmitter 103 may thereafter transmit the SU-signal, $X_s$, into the channel 110 (block 612), as above.

In one embodiment, the secondary transmitter 103 may estimate an interference signal that will be received at the secondary receiver 104, and generate the data signal based, at least in part, on the SU-codeword symbol and the estimated interference signal. Estimating the interference signal at the secondary transmitter 103 may include, for example, estimating (e.g., predicting) an interference to the data signal that will occur at the secondary receiver 104 in response to transmissions of the assist signal. In one embodiment, the secondary transmitter 103 may estimate the interference signal based, at least in part, on the CSI, including, for example, the channel-gain estimates $h_{13}$, $h_{14}$ and $h_{34}$.

In one embodiment, the data signal may be a precoded data signal. Generating the precoded data signal may include the secondary transmitter 103 precoding the SU-codeword symbol based, at least in part, on the estimated interference signal. The secondary transmitter 103 may, for example, use THP to generate the precoded data signal. The precoded data signal may also be generated based on the power split ratio because the power applied to the assist signal component will affect the estimated interference signal. As an alternative, the data signal may be a weighted data signal. Generating the weighted data signal may include the secondary transmitter 103 applying a weight to the data signal in accordance with the power split ratio. In one embodiment, the weight may be and/or include a time varying value. Alternatively, the weight may be based, at least in part, on frequency.

In one embodiment, the secondary transmitter 103 may estimate degradation in the PU-signal received at the primary receiver 102 to occur responsive to the SU-signal, $X_s$, and use such estimate in combination with any of the power and SNR of the SU-tx PU-signal, $h_{13}X_p+Z_3$, in determining the power split ratio. Estimating the degradation may include estimating a quality metric, such as bit error rate (BER), Signal-to-Interference-Noise Ratio (SINR), etc., to occur at the primary receiver 102 responsive to the SU-signal $X_s$.

Figure 8:
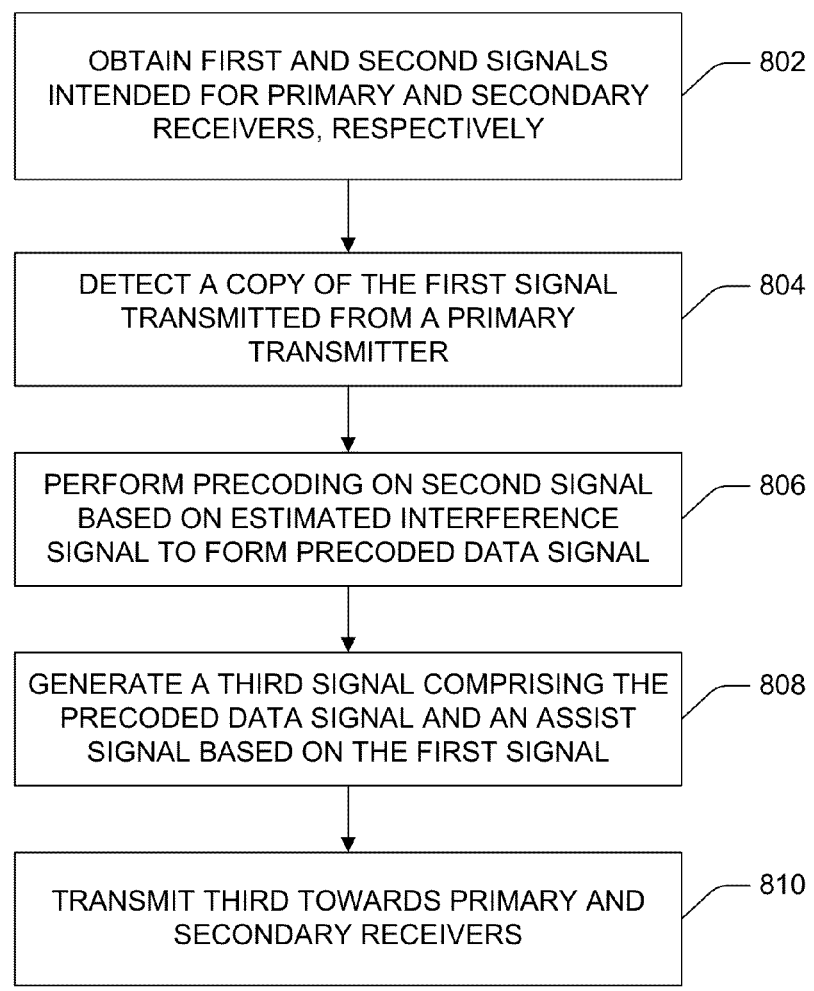
FIG. 8 is a flow chart illustrating an example flow for communicating over a channel in accordance one or more embodiments.

FIG. 8 is a flow chart illustrating an example flow 800 for communicating over a channel. For convenience, the example flow 800 is described with reference to FIGS. 1 and 3-5. The example flow 800 may be carried out in other architectures, as well. In this example, fading is considered, and Gaussian codebooks are not assumed. Also, a non-causal signal path from the primary transmitter 101 to the secondary transmitter 103 and/or use of an auxiliary system, such as the DTV distribution network, is not needed. As described below, a transmission of the PU-signal, $X_p$, may operate as a synchronization message. Further, although the primary receiver 101 may only include a single antenna, the effective channel perceived by the primary receiver 102 may be a multi-tap channel. To provide a delay spread within the equalization capability of the primary receiver 102, the secondary transmitter 103 may send the assist signal before receiving an entire PU-message, $m_p$ (e.g., by simultaneously transmitting and receiving).

As above, the secondary transmitter 103 may obtain first and second signals intended for the primary and secondary receivers 102, 104, respectively (block 802). The first signal may be, for example, the SU-tx PU-signal, $h_{13}X_p+Z_3$, received from the channel 110. The second signal may be, for example, the SU-message, $m_s$. The SU-tx PU-signal, $h_{13}X_p+Z_3$, may include (i) the PU-signal, $X_p$, transmitted from the primary transmitter 101, as operated on by the channel gain, $h_{13}$, and (ii) the channel noise, $Z_3$, associated with the channel 110 between the primary and secondary transmitters 101, 103.

Upon detecting the SU-tx PU-signal, $h_{13}X_p+Z_3$, the secondary transmitter 103 demodulates it into baseband form (i.e., symbol-by symbol) to generate the assist signal, and together with the power split ratio and channel estimates, performs precoding (e.g., THP) (block 806) to form the SU-signal, $X_s$ (block 808)

As part of performing the THP, in one embodiment, the precoder 112 of the secondary transmitter 103 may form a quantization signal (i.e., a precoded data signal) $X_{ss}$, determine the power split ratio, apply the power split ratio to the SU-tx PU-signal, $h_{13}X_p+Z_3$ to form $\alpha(h_{13}X_p+Z_3)$, and combine the quantization signal $X_{ss}$ with $a(h_{13}X_p+Z_3)$. The precoder 112 may assume slow fading when performing THP. After forming the SU-signal, $X_s$, the secondary transmitter 103 may modulate and transmit the SU-signal, $X_s$ (block 810).

In turn, the primary receiver 102 receives and processes a superposed PU-received signal, $Y_p$, as if the transmission from the secondary transmitter 103 is absent, and obtains an estimate $\hat{m}_p$ for the PU-message, $m_p$. The secondary receiver 104 may decode the superposed SU-received signal, $Y_s$, and use THP decoding to obtain an estimate $\hat{m}_s$ for the SU-message, $m_s$.

Retransmitting the SU-tx PU-signal, $h_{13}X_p+Z_3$, from the secondary transmitter 103 may introduce delay diversity to the primary receiver 102. Delay difference, $\Delta\tau$, is $\tau_{13}+T_p+\tau_{32}-\tau_{12}$, where $T_p$ accounts for demodulation delay and other processing delays (if any) at the secondary transmitter 103, and where $\tau_{ij}$ is the propagation delay between node i and node j. Note that $\tau 13+\tau_{32}-\tau_{12} \geq 0$ because the sum of two sides of a triangle is greater than the third side. Thus, the delay difference $\Delta\tau \geq T_p$, and the channel 110 perceived by the primary receiver 102 may be two-tap. In one embodiment, the secondary transmitter 103 may intentionally add further delay when retransmitting the SU-tx PU-signal, $h_{13}X_p+Z_3$. When the channel taps experience independent fading, both a power gain and a delay diversity gain at the primary receiver 102 may be achieved.

In the description that follows, $l_{ij}$ is $\tau_{ij}$ in a number of PU-codeword symbol intervals $i,j=1,\ldots,4$. For simplicity of exposition, $l_{ij}$ is assumed to be an integer. The signal transmitted by the secondary transmitter 103 at time i is:

$$X_s[i]=X_{ss}[i]+\alpha(h_3X_p[i-l_{13}-1]+Z_3[i]) \quad (1)$$

where $X_{ss}[i]$ is the quantization signal generated using the THP, and a determines the power split ratio:

$$\rho=\alpha^2(\sigma_{13}^2+P_p+N_3)/P_s. \quad (2)$$

Because the secondary transmitter 103 need not decode the PU-signal, $X_p$, the noise, $Z_3$, is transmitted to the channel 110 when the secondary transmitter 103 transmits the SU-signal, $X_s$, (as shown in equation (1)). In other embodiments, the secondary transmitter 103 may make a symbol decision (which may include using $h_{13}$) to remove channel distortion and/or noise.

The signal received at the secondary receiver 102 at time i is $$Y_p[i]=h_{12}X_p[i-l_{12}]+\alpha h_{13}h_{32}X_p[i-l']+h_{32}X_{ss}[i-l_{32}]+\alpha h_{32}Z_3[i-l']+Z_2[i], \quad (3)$$

where $l'=l_{13}+l_{32}+1$. The delay spread $k:=l'-l_{12}\geq 1$ because $\Delta\tau \geq T_p$. The assist signal is $\alpha h_{13}h_{32}X_p[i-l']$, and the noise is boosted from $Z_2[i]$ to $Z_2[i]+\alpha h_{32}Z_3[i-l']+h_{32}X_{ss}[i-l_{32}]$. As detailed below and above, the secondary transmitter 103 may determine the power split ratio so as to balance the assistance provided by the assist signal against such noise, and in turn, not degrade the performance of the primary receiver 102.

In one embodiment, the secondary transmitter 103 may estimate the effect of the assistance provided to the primary receiver 102 to determine the power split ratio. A probability of a bit error rate (BER) performance and a matched filter lower bound may be used. The matched filter lower bound may be obtained by detecting a symbol that is the only symbol transmitted over a time interval longer than the channel impulse response. This lower bound may be, for example, within 1 dB from the Maximum Likelihood Sequence Estimation (MLSE) performance for QPSK and a two-tap fading channel with equal channel gains. The BER may be:

$$P_b=E_h[Q(\sqrt{h^H h P_T/N_0})], \quad (4)$$

where $P_T$ is transmit power and $N_0$ is the noise power, and Q( ) represents the Q function. When h consists of a single tap h[0], equation (4) may be expressed as $P_b^{(1)}=\frac{1}{2}(1-\sqrt{\gamma_0/(2+\gamma_0)})$, where $\gamma_0=\sigma_0^2 P_T/N_0$ is an average received SNR for the single-tap channel. When h consists of two taps h[0] and h[k], since $|h[0]|^2$ and $|h[k]|^2$ are both exponential and independently distributed, a probability density function of $v:=h^H h, f_v(v)=(\exp(-v/\sigma_0^2)-\exp(-v/\sigma_k^2))/(\sigma_0^2-\sigma_k^2)$ for $v\geq 0$ is obtained. The BER for the two-tap channel may be expressed as:

$$\tilde{P}_b^{(2)}=\frac{1}{2}\left(1-\frac{1}{\sigma_0^2-\sigma_k^2}\left(\sigma_0^2\sqrt{\frac{\gamma_0}{2+\gamma_0}}-\sigma_k^2\sqrt{\frac{\gamma_k}{2+\gamma_k}}\right)\right), \quad (5)$$

where $\gamma_i=\sigma_i^2 P_T/N_0$, i=0,k. At high SNRs (i.e., $\gamma_0,\gamma_{0k}\gg 1$), $P_b^{(2)}\approx 3/(4\gamma_0\gamma_k)$, which illustrates a gain in delay diversity.

When overlay is not used at all, the channel 110 is one-tap $h[0]=h_{12}$, and the BER is:

$$\tilde{P}_b^{(1)}=\frac{1}{2}(1\sqrt{\gamma_0/(2+\gamma_0)}), \quad (6)$$

where $\gamma_0=\sigma_{12}^2 P_p/N_2$.

When overlay is used as described herein, the channel 110 is two-tap with $h[0]=h_{12}$ and $h[k]=\alpha h_{13}h_{32}$, the received quantization signal $h_{32}X_{ss}$ is Gaussian and serves as interference, and the BER may be approximated as:

$$\tilde{P}_b^{(2)}=\frac{1}{2}\left(1-\frac{1}{\sigma_{12}^2-\alpha^2\sigma_{13}^2\sigma_{32}^2}\left(\sigma_{12}^2\sqrt{\frac{\tilde{\gamma}_0}{2+\tilde{\gamma}_0}}-\alpha^2\sigma_{13}^2\sigma_{32}^2\sqrt{\frac{\tilde{\gamma}_k}{2+\tilde{\gamma}_k}}\right)\right), \quad (7)$$

where $\tilde{\gamma}_0=\sigma_{12}^2 P_p/(N_2+\sigma_{32}^2(1-\rho)P_s+\alpha^2\sigma_{32}^2 N_3)$, $\tilde{\gamma}_k=\alpha^2\sigma_{13}^2\sigma_{32}^2 P_p/(N_2+\sigma_{32}^2(1-\rho)P_s+\alpha^2\sigma_{32}^2 N_3)$ and a is defined in equation (2).

When, however, the scheme described in J. Sachs, et el., "Cognitive Cellular Systems within the TV Spectrum," in *IEEE DySPAN*, Singapore, April 2010 is used, the two taps now collapse into one and the noise, $Z_3$, is not transmitted in the SU-signal, $X_s$, and the BER becomes:

$$\hat{P}_b^{(1)}=\frac{1}{2}(1-\sqrt{\hat{\gamma}_0/(2+\hat{\gamma}_0)}), \quad (8)$$

where $\hat{\gamma}_0=(\sigma_{12}^2 P_p+\rho\sigma_{32}^2 P_s)/(N_2+\sigma_{32}^2(1-\rho)P_s)$.

The secondary transmitter 103 now calculates $\rho$ for which $\tilde{P}_b^{(1)}=\tilde{P}_b^{(2)}$. Such $\rho$ might not exist when, for example, the portion of the SU-tx PU-signal, $h_{13}X_p$, is much weaker than the noise, $Z_3$. When such $\rho$ exists, denoted as $\rho^*$, the secondary transmitter 103 may set $\rho\geq\rho^*$.

After setting $\rho\geq\rho^*$, the second transmitter 103 may generate the SU-signal, $X_s$. To facilitate generating the SU-signal, $X_s$, the secondary transmitter 103, for example, may generate the quantization signal, $X_{ss}$. As part of generating the quantization signal $X_{ss}$, the secondary transmitter 103 may determine a "known interference"—an effective received PU-signal at the secondary receiver 102. This "known interference" may be multi-tap, because, as before, $r_{13}+r_{34}\geq r_{14}$ and at least one PU symbol modulation delay is introduced at the secondary transmitter 103. If the delay spread is $l\geq 1$ PU symbols, the known interference may be:

$$S[i]=h_{34}\alpha(h_{13}X_p[i-l_{13}1]+Z_3[i-l']) \quad (9)$$

After determining the known interference, the secondary transmitter 103 may apply THP to obtain the quantization signal, $X_{ss}$.

The received signal at the secondary receiver 102 is $Y_s[i]=S[i-l_{34}]+h_{34}X_{ss}[i-l_{34}]+Z_4[i]$. The constellation of a desired received QPSK signal at the secondary receiver 102 may be $\alpha(\pm 1\pm j)$. If S[i] is assumed to be totally random (i.e., 2-dimensional uniform distributed), the average transmit power of the quantization signal may be:

$$P_{ss}=(1-\rho)P_s=2\alpha^2/(3\|h_{34}\|^2). \quad (10)$$

Numerical Results

Figure 9:
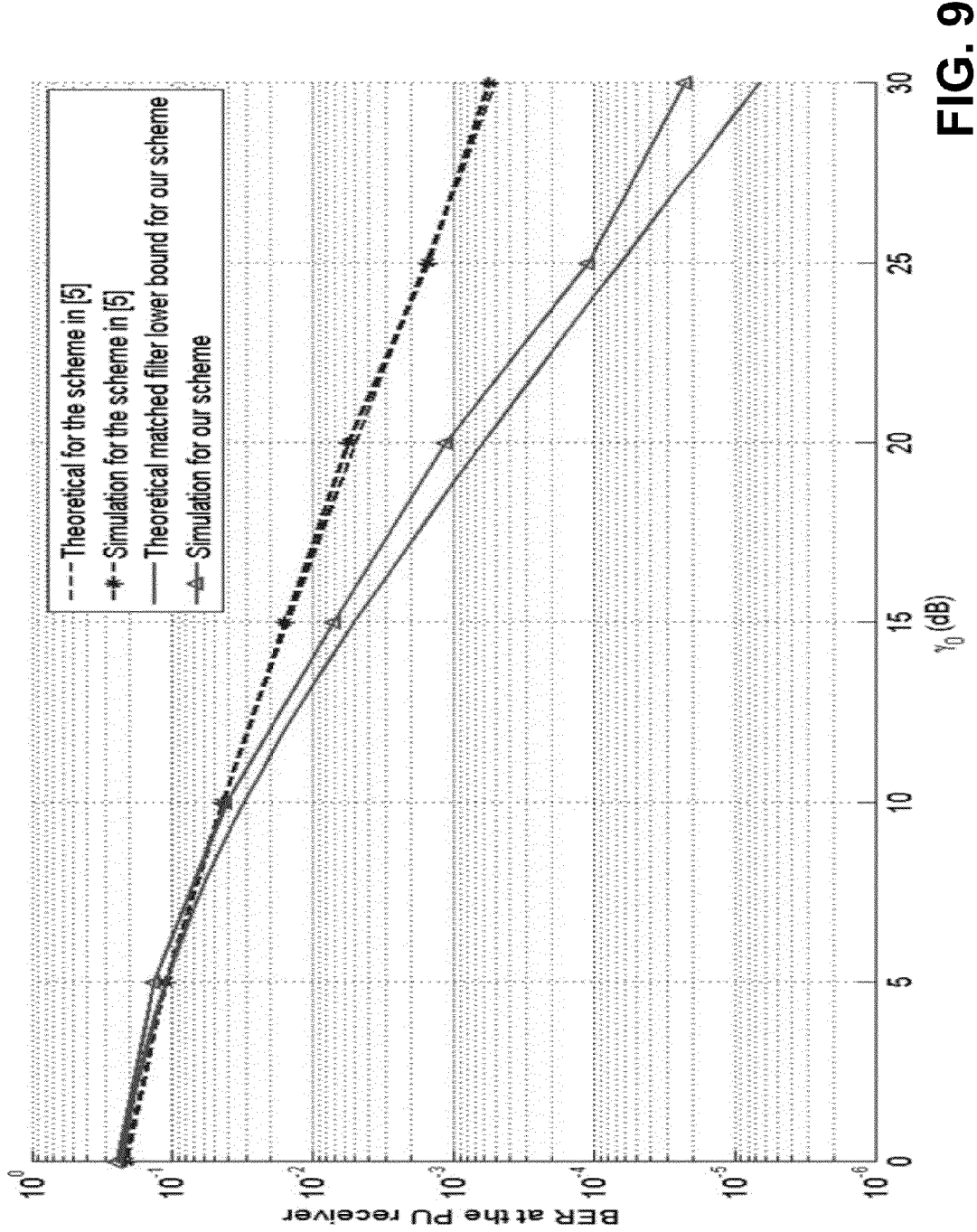
FIG. 9 is chart illustrating BER performance of a primary receiver in accordance one or more embodiments.

FIG. 9 is chart illustrating BER performance of a primary receiver using the teachings herein as compared to the teachings of J. Sachs, et al., "Cognitive Cellular Systems within the TV Spectrum," in *IEEE DySPAN*, Singapore, April 2010 (referred to as [5] in FIG. 7).

The power split ratio $\rho$ is determined for [5] by solving $\rho$ for which $\gamma_0 = \hat{\gamma}_0$. The same value of $\rho$ is then applied by the secondary transmitter 103. The primary receiver 102 uses a Viterbi algorithm to perform MLSE. In determining the BER shown in FIG. 9, the following variables were set as $P_p = P_s$, $\sigma_{i,j}^2 = \sigma_{i',j'}^2$, $N_i = N_{i'}$ for all i, j, i',j', and $\gamma_0 = \sigma^2/N_2$ was varied. The performance for [5] is the same as Rayleigh fading. FIG. 9 shows that the BER performance of the primary receiver 102 using the teachings herein (solid line with triangles) offers a delay diversity gain that, due to its amplify-and-forward relaying, is able to compensate for additional interference caused to the primary receiver 102 by the SU-signal, $X_s$. As shown, at high SNR, the primary receiver 102 using the teachings herein significantly outperforms, in terms of BER, a primary receiver using the teachings in [5].

Alternative Architectures

Figure 10:
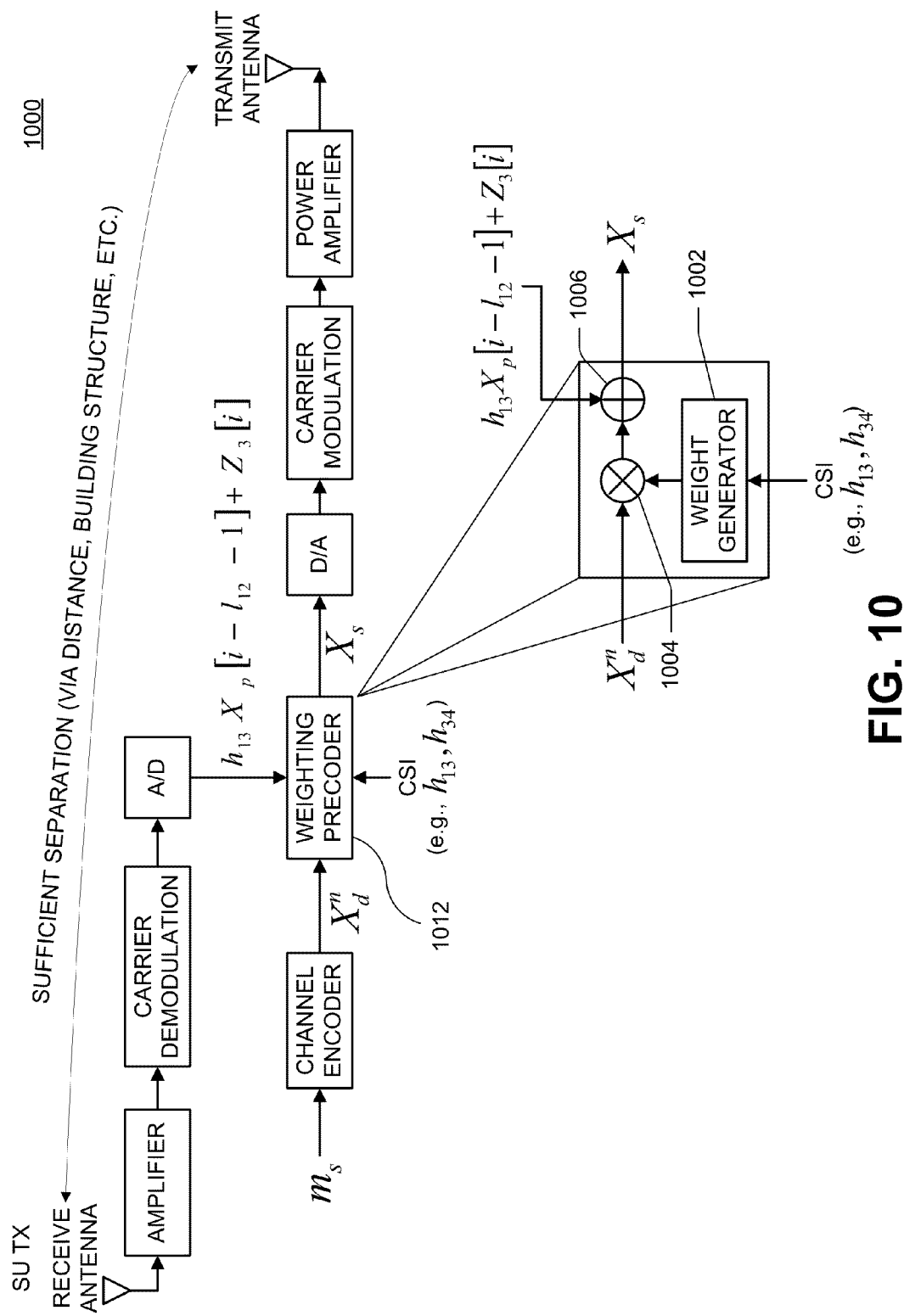
FIG. 10 is a block diagram illustrating an example secondary transmitter in accordance one or more embodiments.

FIG. 10 is a block diagram illustrating another example secondary transmitter 1000. The secondary transmitter 1000 of FIG. 10 is similar to the secondary transmitters 103 and 203 of FIGS. 1, 2 and 4, except as described herein. The secondary transmitter 1000 may use antenna separation to support simultaneous reception and transmission (instead of, e.g., a small-form factor full-duplex radio employing self/echo cancelation, such as, for example, in M. Jainy, et al., "Practical, Real-Time, Full Duplex Wireless," *MobiCom*, Las Vegas, Nev., September 2011). Relative long distance and building structures etc. may be exploited to offer such antenna separation. Details of various techniques for obtaining transmit/receive isolation may be found in, for example, cellular boosters and repeaters.

As an alternative to the THP of FIG. 5, the precoder 1012 of the secondary transmitter 1000 (hereinafter "weighting precoder 1012") may include a weight generator 1002, a multiplier 1004 and an adder 1006. In operation, the weighting precoder 1012 may apply a weight to the SU-message codeword, $X_d^n(m_s)$, to form a weighted data signal, and add it to the SU-tx PU-signal, h13$X_p + Z_3$, to form, at least in part, the SU-signal, $X_s$. When forming the SU-message codeword, $X_d^n(m_s)$, the channel encoder may provide a sufficient amount of coding to permit a decoder of the secondary receiver 104 to extract the SU-signal, $X_s$, with acceptable SNR, bit error rate and/or other metric. Examples may include use of wideband modulation (spread spectrum, ultra-wideband, etc.), forward error correction (turbo-coding, Reed Solomon coding, etc.) of a sufficiently low rate, or a combination.

The weight generator 1002 may generate the weight such that a SNR of the PU-signal, $X_p$, is sufficient to guarantee that the primary receiver 102, unaware that the SU-signal, $X_s$, is originating from the secondary transmitter 103, may receive the PU-signal, $X_p$, at any location of interest. The weight generator 1002 may, for example, include elements for carrying out and/or carry out processes for measuring the power, or SNR, of the PU-signal, $X_p$, (e.g., the SU-tx PU-signal, $h_{13}X_p + Z_3$), and use such measurements to compute the weight. The weight may be a time varying value, for example. Given the measurements of the PU-signal, $X_p$, may be a function of frequency, the weight may be frequency dependent.

Although not shown, the secondary transmitter 1000 may include a THP as an alternative to the weighting precoder 1012. Such THP may be, for example, the THP of FIG. 5.

Figure 11:
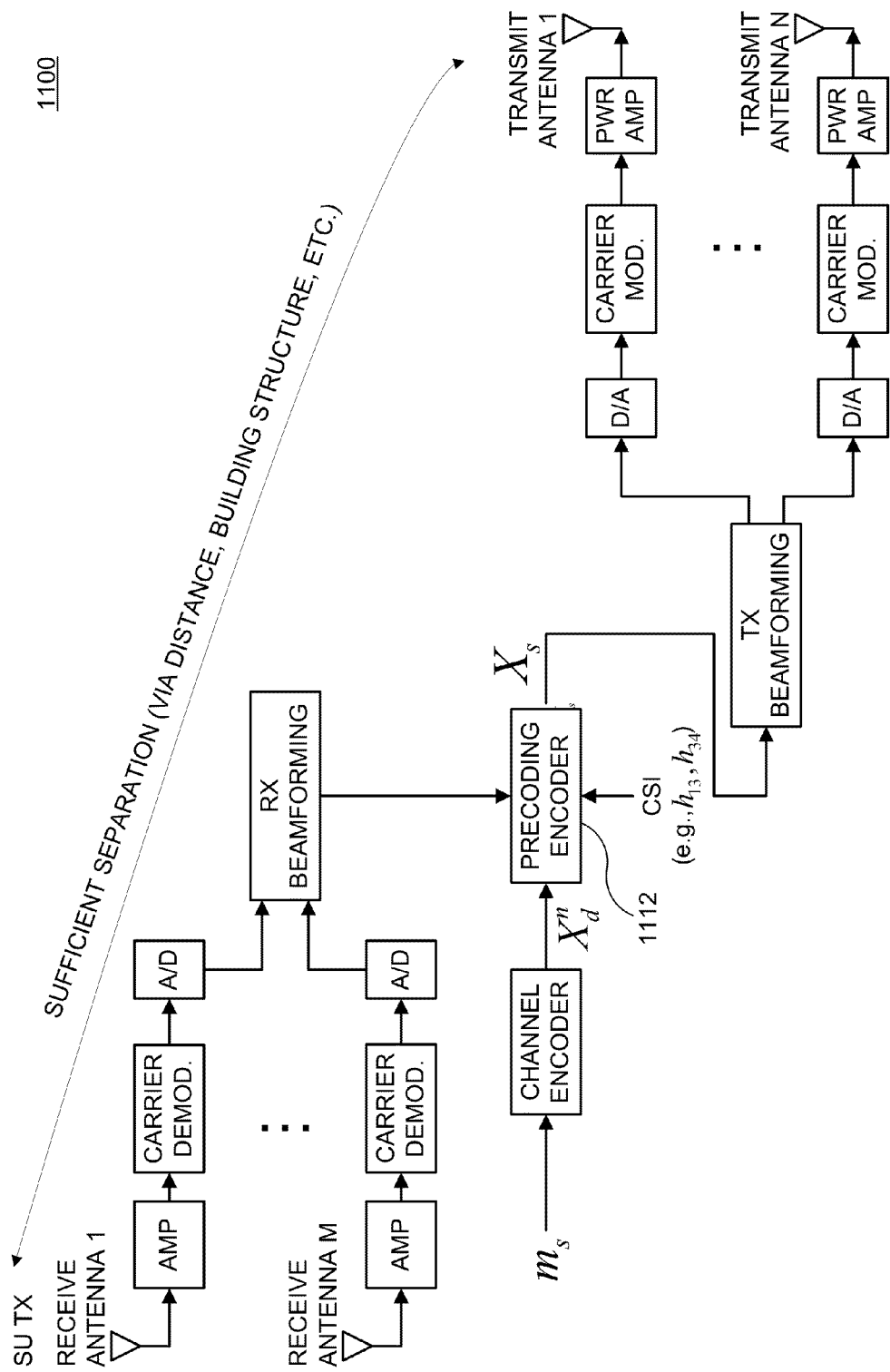
FIG. 11 is a block diagram illustrating an example secondary transmitter in accordance one or more embodiments.

Referring now to FIG. 11, a block diagram illustrating another example secondary transmitter 1100 is shown. As shown in FIG. 11, the secondary transmitter 1100 may include M receive antennas, N transmit antennas, and employ receive and/or transmit beamforming to improve effectiveness of the antenna separation. For example, the receive beamforming can be used to improve the SNR of the SU-tx PU-signal, $h_{13}X_p + Z_3$, before combining it with the data signal. The transmit beamforming may be used to direct the transmitted signal towards a known location of the secondary receiver 104 to further reduce interference to the primary receiver 102.

The precoding of the data signal and/or generation of the SU-signal, $X_s$, may be combined with the transmit beamforming to enhance performance of the secondary receiver 104. For example, the PU-signal, $X_p$, may be radiated with a near omni-directional pattern while spatial processing (precoding/beamforming) of the SU-signal, $X_s$, may be used to enhance the performance of the secondary receiver 104. A precoder 1112 of the secondary transmitter 1100 may be a THP, such as, for example, the THP of FIG. 5. Alternatively, the precoder 1112 may be a weighting precoder, such as, for example, the weighting precoder 1012 of the secondary transmitter 1000 of FIG. 10.

In one embodiment, the secondary receiver 104, may have non-causal knowledge of timing information for synchronizing the SU-signal, $X_s$, with the PU-signal, $X_p$. The secondary receiver 104 may, for example, obtain the timing information from the primary-msg source.

Although not shown in FIGS. 1-11, in various embodiments, the communication system 100 may include a plurality of secondary transmitters; each of which may be base stations of adjacent cells of a wireless communication network. When the secondary receiver 104 is operating at a cell edge, the secondary transmitters may cooperate to determine, which has the best signal quality to the secondary receiver 104. Once determined, such secondary transmitter performs generates and transmits the SU-signal, $X_s$, and the other secondary transmitters refrain from transmitting to the secondary receiver 104. This will provide a diversity gain if the signal quality varies independently across the secondary transmitters.

As an alternative, each of the secondary transmitters may independently generate copies of the SU-signal, $X_s$, and the "known interference" accounts for two relay signals from the secondary transmitter. The precoded data signals sent by the secondary transmitters may be a corresponding fraction (e.g., ½ for two secondary transmitters, . . . , 1/n for n secondary transmitters) of the precoded data signal, $X_{ss}$. When precoded data signals sent by the secondary transmitters are added together, the total precoded data signal is Xss. Like above, this also provides a diversity gain, because the probability that the noises at the secondary transmitters are strong will be smaller than the probability that one noise at a single secondary transmitter is strong.

Figure 12A:
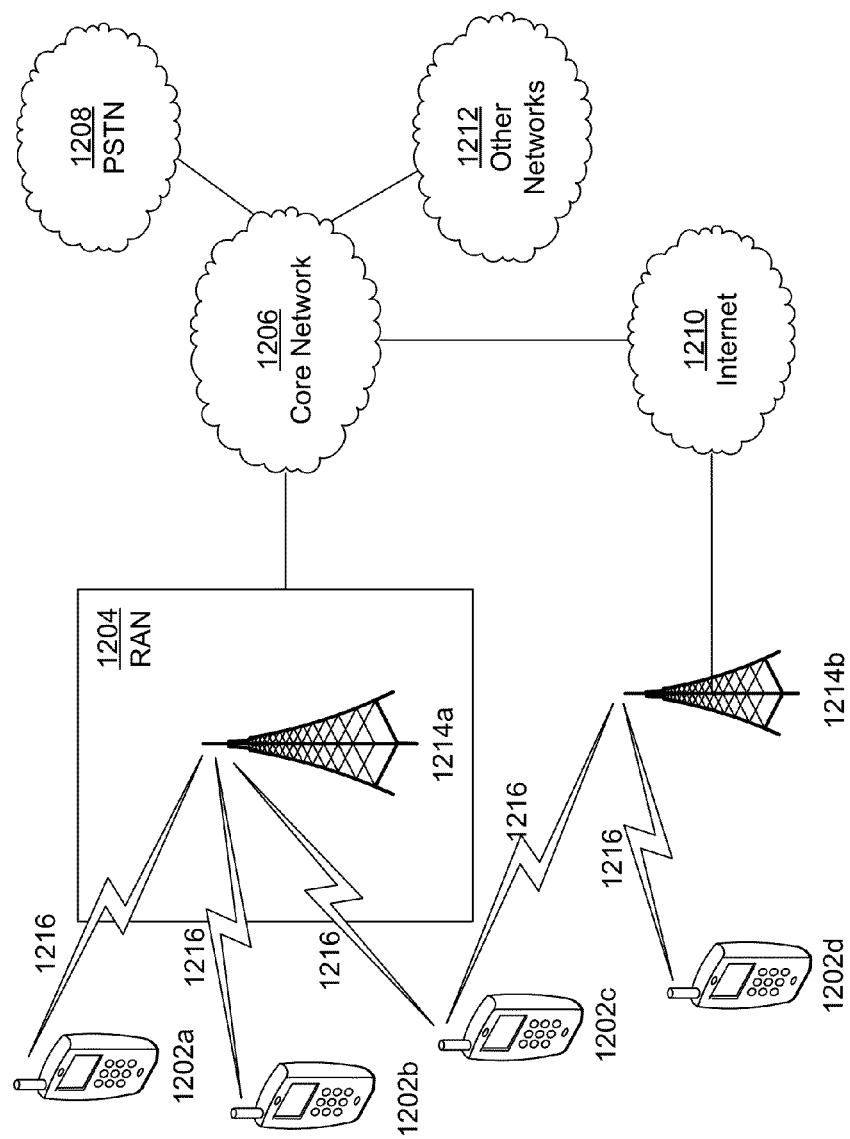
FIG. 12A is a diagram of an example communications system in which one or more disclosed embodiments may be implemented.

FIG. 12A is a diagram of an example communications system 1100 in which one or more disclosed embodiments may be implemented. The communications system 1200 may be a multiple access system that provides content, such as voice, data, video, messaging, broadcast, etc., to multiple wireless users. The communications system 1200 may enable multiple wireless users to access such content through the sharing of system resources, including wireless bandwidth. For example, the communications systems 1200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 12A, the communications system 1200 may include wireless transmit/receive units (WTRUs) 1202a, 1202b, 1202c, 1202d, a radio access network (RAN) 1204, a core network 1206, a public switched telephone network (PSTN) 1208, the Internet 1210, and other networks 1212, though it will be appreciated that the disclosed embodiments contemplate any number of WTRUs, base stations, networks, and/or network elements. Each of the WTRUs 1202a, 1202b, 1202c, 1202d may be any type of device configured to operate and/or communicate in a wireless environment. By way of example, the WTRUs 1202a, 1202b, 1202c, 1202d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a tablet computer, a wireless sensor, consumer electronics, and the like.

The communications systems 1200 may also include a base station 1214a and a base station 1214b. Each of the base stations 1214a, 1214b may be any type of device configured to wirelessly interface with at least one of the WTRUs 1202a, 1202b, 1202c, 1202d to facilitate access to one or more communication networks, such as the core network 1206, the Internet 1210, and/or the networks 1212. By way of example, the base stations 1214a, 1214b may be a base transceiver station (BTS), a Node-B, an eNode B, a Home Node B, a Home eNode B, a site controller, an access point (AP), a wireless router, and the like. While the base stations 1214a, 1214b are each depicted as a single element, it will be appreciated that the base stations 1214a, 1214b may include any number of interconnected base stations and/or network elements.

The base station 1214a may be part of the RAN 1204, which may also include other base stations and/or network elements (not shown), such as a base station controller (BSC), a radio network controller (RNC), relay nodes, etc. The base station 1214a and/or the base station 1214b may be configured to transmit and/or receive wireless signals within a particular geographic region, which may be referred to as a cell (not shown). The cell may further be divided into cell sectors. For example, the cell associated with the base station 1214a may be divided into three sectors. Thus, in one embodiment, the base station 1214a may include three transceivers, i.e., one for each sector of the cell. In another embodiment, the base station 1214a may employ multiple-input multiple output (MIMO) technology and, therefore, may utilize multiple transceivers for each sector of the cell.

The base stations 1214a, 1214b may communicate with one or more of the WTRUs 1202a, 1202b, 1202c, 1202d over an air interface 1216, which may be any suitable wireless communication link (e.g., radio frequency (RF), microwave, infrared (IR), ultraviolet (UV), visible light, etc.). The air interface 1216 may be established using any suitable radio access technology (RAT).

More specifically, as noted above, the communications system 1200 may be a multiple access system and may employ one or more channel access schemes, such as CDMA, TDMA, FDMA, OFDMA, SC-FDMA, and the like. For example, the base station 1214a in the RAN 1204 and the WTRUs 1202a, 1202b, 1202c may implement a radio technology such as Universal Mobile Telecommunications System (UMTS) Terrestrial Radio Access (UTRA), which may establish the air interface 1216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1214a and the WTRUs 1202a, 1202b, 1202c may implement a radio technology such as Evolved UMTS Terrestrial Radio Access (E-UTRA), which may establish the air interface 1216 using Long Term Evolution (LTE) and/or LTE-Advanced (LTE-A).

In other embodiments, the base station 1214a and the WTRUs 1202a, 1202b, 1202c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1214b in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1214b and the WTRUs 1202c, 1202d may implement a radio technology such as IEEE 802.11 to establish a wireless local area network (WLAN). In another embodiment, the base station 1214b and the WTRUs 1202c, 1202d may implement a radio technology such as IEEE 802.15 to establish a wireless personal area network (WPAN). In yet another embodiment, the base station 1214b and the WTRUs 1202c, 1202d may utilize a cellular-based RAT (e.g., WCDMA, CDMA2000, GSM, LTE, LTE-A, etc.) to establish a picocell or femtocell. As shown in FIG. 12A, the base station 1214b may have a direct connection to the Internet 1210. Thus, the base station 1214b may not be required to access the Internet 1210 via the core network 1206.

The RAN 1204 may be in communication with the core network 1206, which may be any type of network configured to provide voice, data, applications, and/or voice over internet protocol (VoIP) services to one or more of the WTRUs 1202a, 1202b, 1202c, 1202d. For example, the core network 1206 may provide call control, billing services, mobile location-based services, pre-paid calling, Internet connectivity, video distribution, etc., and/or perform high-level security functions, such as user authentication. Although not shown in FIG. 12A, it will be appreciated that the RAN 1204 and/or the core network 1206 may be in direct or indirect communication with other RANs that employ the same RAT as the RAN 1204 or a different RAT. For example, in addition to being connected to the RAN 1204, which may be utilizing an E-UTRA radio technology, the core network 1206 may also be in communication with another RAN (not shown) employing a GSM radio technology.

The core network 1206 may also serve as a gateway for the WTRUs 1202a, 1202b, 1202c, 1202d to access the PSTN 1208, the Internet 1210, and/or other networks 1212. The PSTN 1208 may include circuit-switched telephone networks that provide plain old telephone service (POTS). The Internet 1210 may include a global system of interconnected computer networks and devices that use common communication protocols, such as the transmission control protocol (TCP), user datagram protocol (UDP) and the internet protocol (IP) in the TCP/IP internet protocol suite. The networks 1212 may include wired or wireless communications networks owned and/or operated by other service providers. For example, the networks 1212 may include another core network connected to one or more RANs, which may employ the same RAT as the RAN 1204 or a different RAT.

Some or all of the WTRUs 1202a, 1202b, 1202c, 1202d in the communications system 1200 may include multi-mode capabilities, i.e., the WTRUs 1202a, 1202b, 1202c, 1202d may include multiple transceivers for communicating with different wireless networks over different wireless links. For example, the WTRU 1202c shown in FIG. 12A may be configured to communicate with the base station 1214a, which may employ a cellular-based radio technology, and with the base station 1214b, which may employ an IEEE 802 radio technology.

Figure 12B:
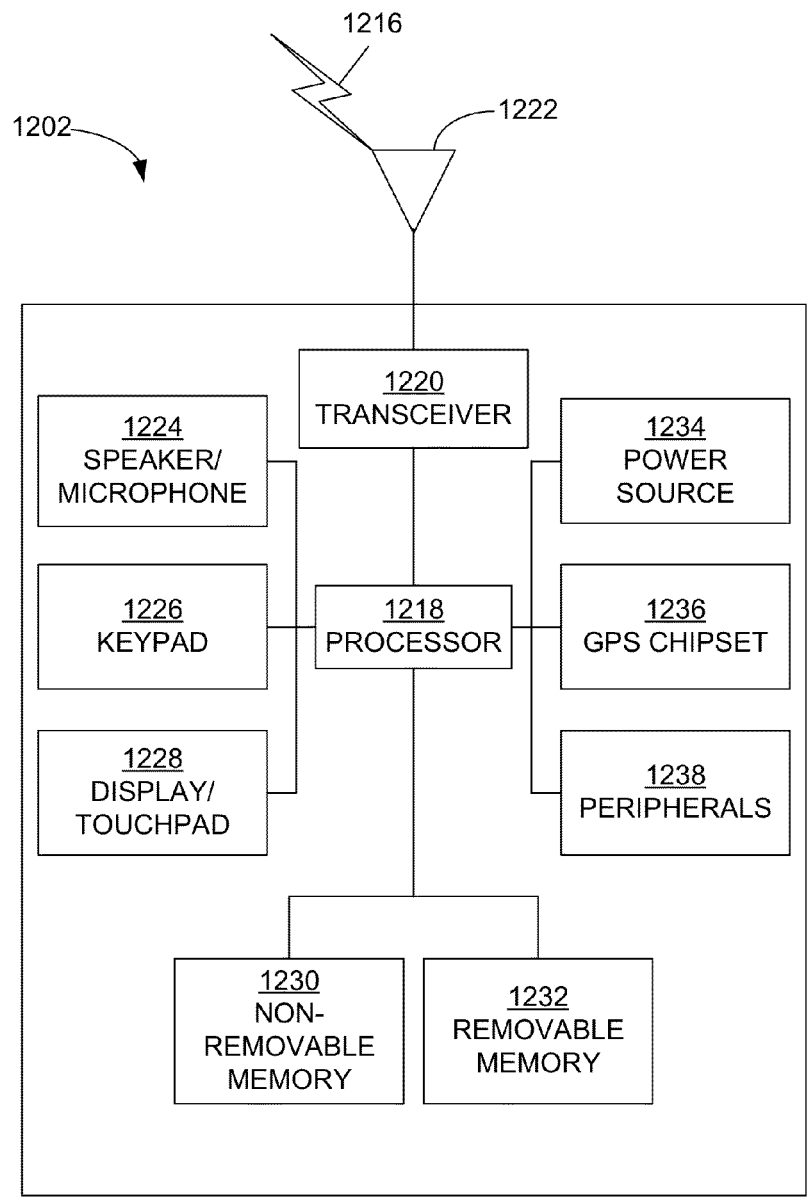
FIG. 12B is a system diagram of an example wireless transmit/receive unit (WTRU) that may be used within the communications system illustrated in FIG. 12A.

FIG. 12B is a system diagram of an example WTRU 1202. As shown in FIG. 12B, the WTRU 1202 may include a processor 1218, a transceiver 1220, a transmit/receive element 1222, a speaker/microphone 1224, a keypad 1226, a display/touchpad 1228, non-removable memory 19, removable memory 1232, a power source 1234, a global positioning system (GPS) chipset 1236, and other peripherals 1238. It will be appreciated that the WTRU 1202 may include any sub-combination of the foregoing elements while remaining consistent with an embodiment.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 12B depicts the processor 1218 and the transceiver 1220 as separate components, it will be appreciated that the processor 1218 and the transceiver 1220 may be integrated together in an electronic package or chip.

The transmit/receive element 1222 may be configured to transmit signals to, or receive signals from, a base station (e.g., the base station 1214a) over the air interface 1216. For example, in one embodiment, the transmit/receive element 1222 may be an antenna configured to transmit and/or receive RF signals. In another embodiment, the transmit/receive element 1222 may be an emitter/detector configured to transmit and/or receive IR, UV, or visible light signals, for example. In yet another embodiment, the transmit/receive element 1222 may be configured to transmit and receive both RF and light signals. It will be appreciated that the transmit/receive element 1222 may be configured to transmit and/or receive any combination of wireless signals.

In addition, although the transmit/receive element 1222 is depicted in FIG. 12B as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 19 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In other embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may also be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1216 from a base station (e.g., base stations 1214a, 1214b) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12C:
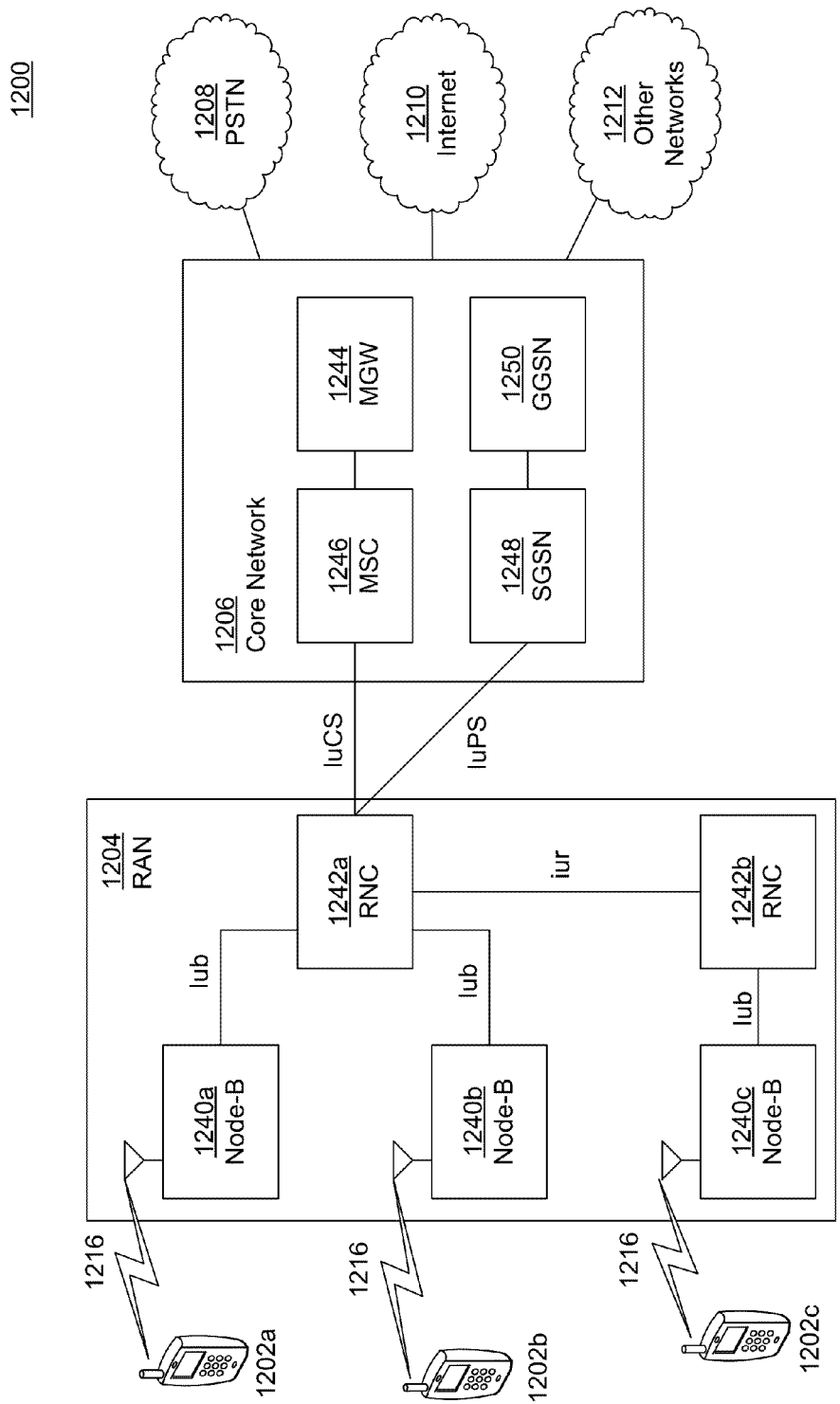
FIG. 12C is a system diagram of an example radio access network and an example core network that may be used within the communications system illustrated in FIG. 12A.

FIG. 12C is a system diagram of the RAN 1204 and the core network 1206 according to an embodiment. As noted above, the RAN 1204 may employ a UTRA radio technology to communicate with the WTRUs 1202a, 1202b, 1202c over the air interface 1216. The RAN 1204 may also be in communication with the core network 1206. As shown in FIG. 12C, the RAN 1204 may include Node-Bs 1240a, 1240b, 1240c, which may each include one or more transceivers for communicating with the WTRUs 1202a, 1202b, 1202c over the air interface 1216. The Node-Bs 1240a, 1240b, 1240c may each be associated with a particular cell (not shown) within the RAN 1204. The RAN 1204 may also include RNCs 1242a, 1242b. It will be appreciated that the RAN 1204 may include any number of Node-Bs and RNCs while remaining consistent with an embodiment.

As shown in FIG. 12C, the Node-Bs 1240a, 1240b may be in communication with the RNC 1242a. Additionally, the Node-B 1240c may be in communication with the RNC 1242b. The Node-Bs 1240a, 1240b, 1240c may communicate with the respective RNCs 1242a, 1242b via an Iub interface. The RNCs 1242a, 1242b may be in communication with one another via an Iur interface. Each of the RNCs 1242a, 1242b may be configured to control the respective Node-Bs 1240a, 1240b, 1240c to which it is connected. In addition, each of the RNCs 1242a, 1242b may be configured to carry out or support other functionality, such as outer loop power control, load control, admission control, packet scheduling, handover control, macrodiversity, security functions, data encryption, and the like.

The core network 1206 shown in FIG. 12C may include a media gateway (MGW) 1244, a mobile switching center (MSC) 1246, a serving GPRS support node (SGSN) 1248, and/or a gateway GPRS support node (GGSN) 1250. While each of the foregoing elements are depicted as part of the core network 1206, it will be appreciated that any one of these elements may be owned and/or operated by an entity other than the core network operator.

The RNC 1242a in the RAN 1204 may be connected to the MSC 1246 in the core network 1206 via an IuCS interface. The MSC 1246 may be connected to the MGW 1244. The MSC 1246 and the MGW 1244 may provide the WTRUs 1202a, 1202b, 1202c with access to circuit-switched networks, such as the PSTN 1208, to facilitate communications between the WTRUs 1202a, 1202b, 1202c and traditional land-line communications devices.

The RNC 1242a in the RAN 1204 may also be connected to the SGSN 1248 in the core network 1206 via an IuPS interface. The SGSN 1248 may be connected to the GGSN 1250. The SGSN 1248 and the GGSN 1250 may provide the WTRUs 1202a, 1202b, 1202c with access to packet-switched networks, such as the Internet 1210, to facilitate communications between and the WTRUs 1202a, 1202b, 1202c and IP-enabled devices.

As noted above, the core network 1206 may also be connected to the networks 1212, which may include other wired or wireless networks that are owned and/or operated by other service providers.

Figure 12D:
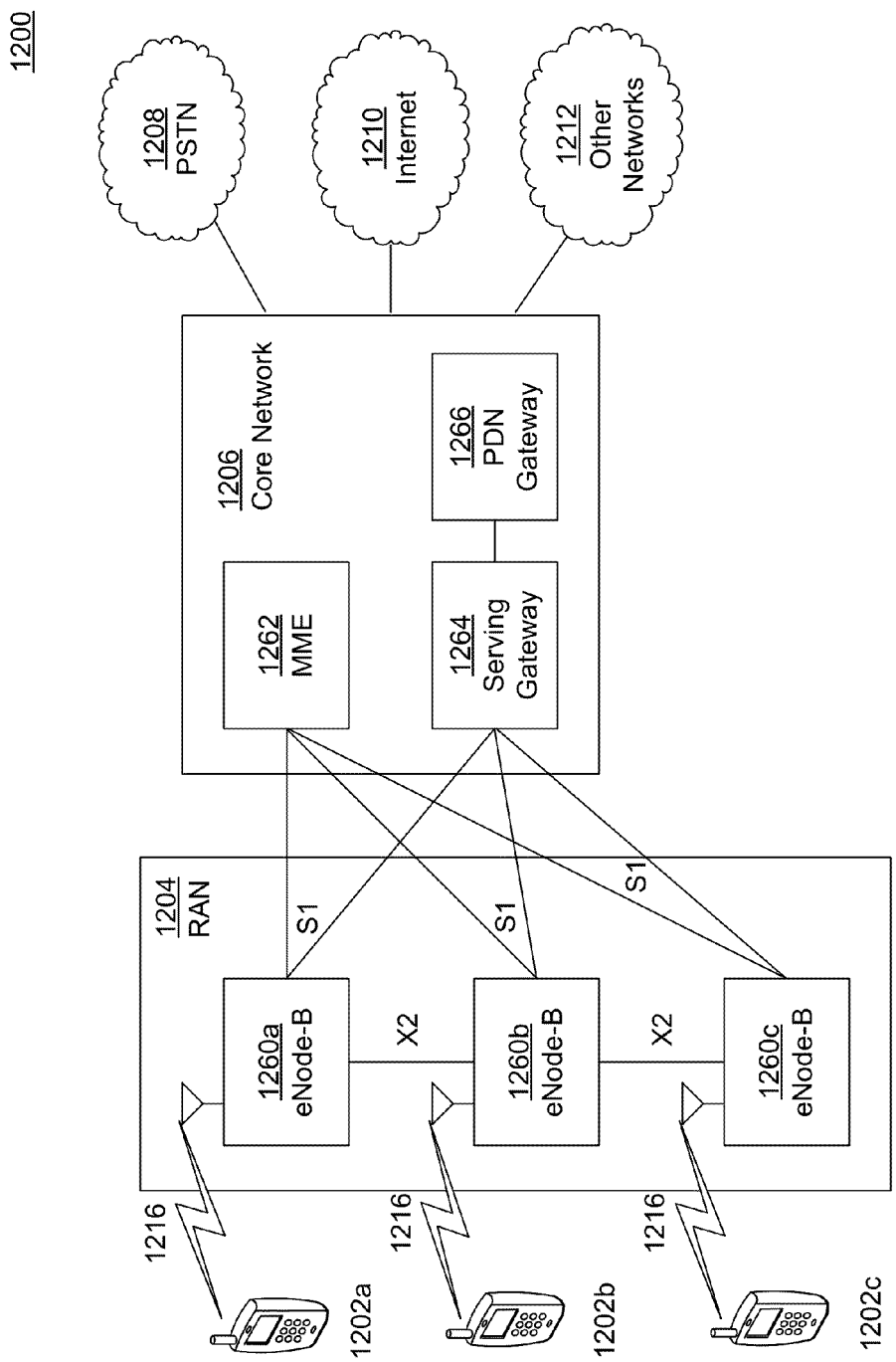
FIG. 12D is a system diagram of another example radio access network and an example core network that may be used within the communications system illustrated in FIG. 12A.

FIG. 12D is a system diagram of the RAN 1204 and the core network 1206 according to an embodiment. As noted above, the RAN 1204 may employ an E-UTRA radio technology to communicate with the WTRUs 1202a, 1202b, 1202c over the air interface 1216. The RAN 1204 may also be in communication with the core network 1206.

The RAN 1204 may include eNode-Bs 1260a, 1260b, 1260c, though it will be appreciated that the RAN 1204 may include any number of eNode-Bs while remaining consistent with an embodiment. The eNode-Bs 1260a, 1260b, 1260c may each include one or more transceivers for communicating with the WTRUs 1202a, 1202b, 1202c over the air interface 1216. In one embodiment, the eNode-Bs 1260a, 1260b, 1260c may implement MIMO technology. Thus, the eNode-B 1260a, for example, may use multiple antennas to transmit wireless signals to, and receive wireless signals from, the WTRU 1202a.

Each of the eNode-Bs 1260a, 1260b, 1260c may be associated with a particular cell (not shown) and may be configured to handle radio resource management decisions, handover decisions, scheduling of users in the uplink and/or downlink, and the like. As shown in FIG. 12D, the eNode-Bs 1260a, 1260b, 1260c may communicate with one another over an X2 interface.

The core network 1206 shown in FIG. 12D may include a mobility management gateway (MME) 1262, a serving gateway 1264, and a packet data network (PDN) gateway 1266. While each of the foregoing elements are depicted as part of the core network 1206, it will be appreciated that any one of these elements may be owned and/or operated by an entity other than the core network operator.

The MME 1262 may be connected to each of the eNode-Bs 1260a, 1260b, 1260c in the RAN 1204 via an S1 interface and may serve as a control node. For example, the MME 1262 may be responsible for authenticating users of the WTRUs 1202a, 1202b, 1202c, bearer activation/deactivation, selecting a particular serving gateway during an initial attach of the WTRUs 1202a, 1202b, 1202c, and the like. The MME 1242 may also provide a control plane function for switching between the RAN 1204 and other RANs (not shown) that employ other radio technologies, such as GSM or WCDMA.

The serving gateway 1264 may be connected to each of the eNode Bs 1260a, 1260b, 1260c in the RAN 1204 via the S1 interface. The serving gateway 1264 may generally route and forward user data packets to/from the WTRUs 1202a, 1202b, 1202c. The serving gateway 1264 may also perform other functions, such as anchoring user planes during inter-eNode B handovers, triggering paging when downlink data is available for the WTRUs 1202a, 1202b, 1202c, managing and storing contexts of the WTRUs 1202a, 1202b, 1202c, and the like.

The serving gateway 1264 may also be connected to the PDN gateway 1266, which may provide the WTRUs 1202a, 1202b, 1202c with access to packet-switched networks, such as the Internet 1210, to facilitate communications between the WTRUs 1202a, 1202b, 1202c and IP-enabled devices.

The core network 1206 may facilitate communications with other networks. For example, the core network 1206 may provide the WTRUs 1202a, 1202b, 1202c with access to circuit-switched networks, such as the PSTN 1208, to facilitate communications between the WTRUs 1202a, 1202b, 1202c and traditional land-line communications devices. For example, the core network 1206 may include, or may communicate with, an IP gateway (e.g., an IP multimedia subsystem (IMS) server) that serves as an interface between the core network 1206 and the PSTN 1208. In addition, the core network 1206 may provide the WTRUs 1202a, 1202b, 1202c with access to the networks 1212, which may include other wired or wireless networks that are owned and/or operated by other service providers.

Figure 12E:
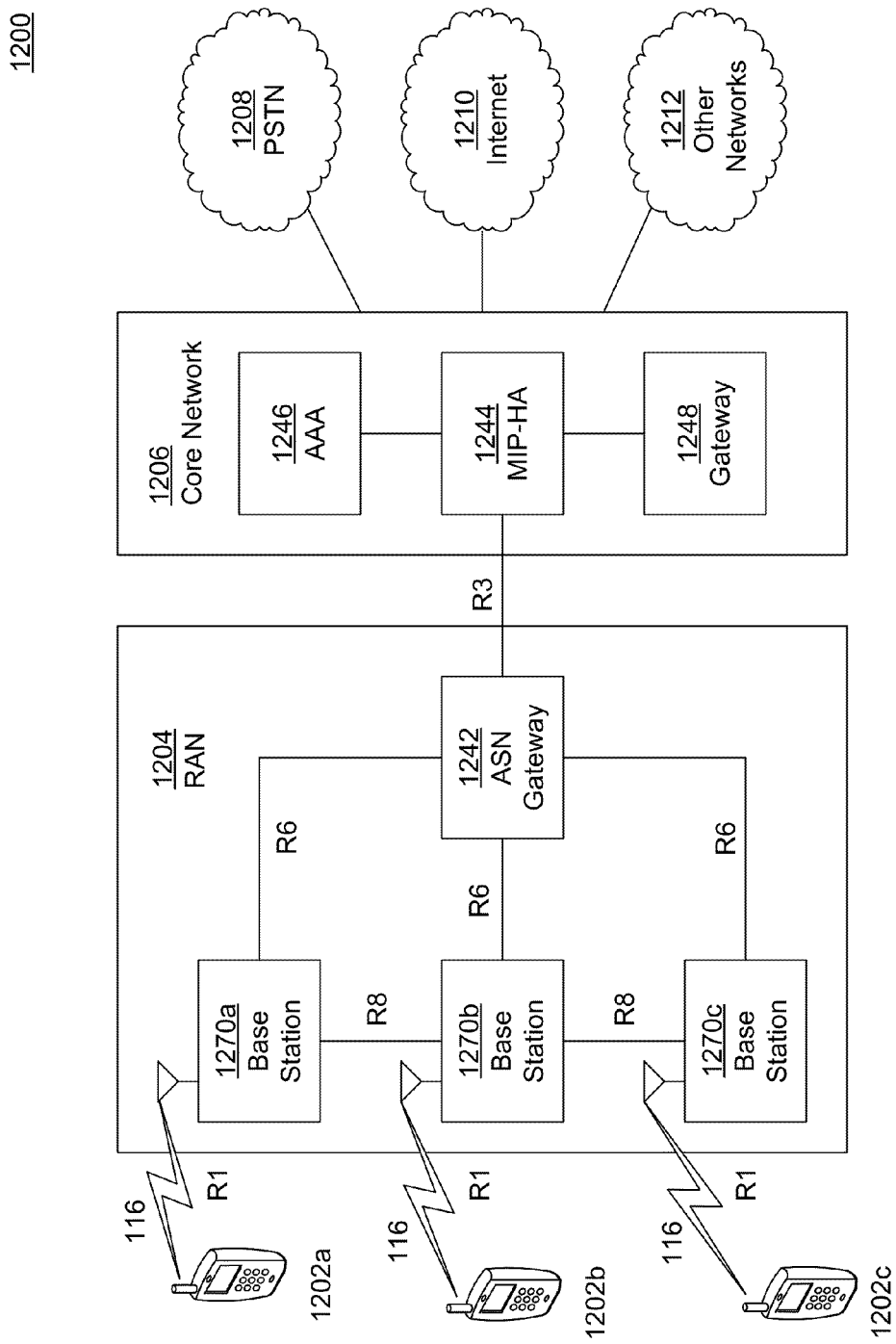
FIG. 12E is a system diagram of another example radio access network and an example core network that may be used within the communications system illustrated in FIG. 12A.

FIG. 12E is a system diagram of the RAN 1204 and the core network 1206 according to an embodiment. The RAN 1204 may be an access service network (ASN) that employs IEEE 802.16 radio technology to communicate with the WTRUs 1202a, 1202b, 1202c over the air interface 1216. As will be further discussed below, the communication links between the different functional entities of the WTRUs 1202a, 1202b, 1202c, the RAN 1204, and the core network 1206 may be defined as reference points.

As shown in FIG. 12E, the RAN 1204 may include base stations 1270a, 1270b, 1270c, and an ASN gateway 1242, though it will be appreciated that the RAN 1204 may include any number of base stations and ASN gateways while remaining consistent with an embodiment. The base stations 1270a, 1270b, 1270c may each be associated with a particular cell (not shown) in the RAN 1204 and may each include one or more transceivers for communicating with the WTRUs 1202a, 1202b, 1202c over the air interface 1216. In one embodiment, the base stations 1270a, 1270b, 1270c may implement MIMO technology. Thus, the base station 1270a, for example, may use multiple antennas to transmit wireless signals to, and receive wireless signals from, the WTRU 1202a. The base stations 1270a, 1270b, 1270c may also provide mobility management functions, such as handoff triggering, tunnel establishment, radio resource management, traffic classification, quality of service (QoS) policy enforcement, and the like. The ASN gateway 1242 may serve as a traffic aggregation point and may be responsible for paging, caching of subscriber profiles, routing to the core network 1206, and the like.

The air interface 1216 between the WTRUs 1202a, 1202b, 1202c and the RAN 1204 may be defined as an R1 reference point that implements the IEEE 802.16 specification. In addition, each of the WTRUs 1202a, 1202b, 1202c may establish a logical interface (not shown) with the core network 1206. The logical interface between the WTRUs 1202a, 1202b, 1202c and the core network 1206 may be defined as an R2 reference point, which may be used for authentication, authorization, IP host configuration management, and/or mobility management.

The communication link between each of the base stations 1270a, 1270b, 1270c may be defined as an R8 reference point that includes protocols for facilitating WTRU handovers and the transfer of data between base stations. The communication link between the base stations 1270a, 1270b, 1270c and the ASN gateway 1242 may be defined as an R6 reference point. The R6 reference point may include protocols for facilitating mobility management based on mobility events associated with each of the WTRUs 1202a, 1202b, 1202c.

As shown in FIG. 12E, the RAN 1204 may be connected to the core network 1206. The communication link between the RAN 1204 and the core network 1206 may defined as an R3 reference point that includes protocols for facilitating data transfer and mobility management capabilities, for example. The core network 1206 may include a mobile IP home agent (MIP-HA) 1244, an authentication, authorization, accounting (AAA) server 1246, and a gateway 1248. While each of the foregoing elements are depicted as part of the core network 1206, it will be appreciated that any one of these elements may be owned and/or operated by an entity other than the core network operator.

The MIP-HA 1244 may be responsible for IP address management, and may enable the WTRUs 1202a, 1202b, 1202c to roam between different ASNs and/or different core networks. The MIP-HA 1244 may provide the WTRUs 1202a, 1202b, 1202c with access to packet-switched networks, such as the Internet 1210, to facilitate communications between the WTRUs 1202a, 1202b, 1202c and IP-enabled devices. The AAA server 1246 may be responsible for user authentication and for supporting user services. The gateway 1248 may facilitate interworking with other networks. For example, the gateway 1248 may provide the WTRUs 1202a, 1202b, 1202c with access to circuit-switched networks, such as the PSTN 1208, to facilitate communications between the WTRUs 1202a, 1202b, 1202c and traditional land-line communications devices. In addition, the gateway 1248 may provide the WTRUs 1202a, 1202b, 1202c with access to the networks 1212, which may include other wired or wireless networks that are owned and/or operated by other service providers.

Although not shown in FIG. 12E, it will be appreciated that the RAN 1204 may be connected to other ASNs and the core network 1206 may be connected to other core networks. The communication link between the RAN 1204 the other ASNs may be defined as an R4 reference point, which may include protocols for coordinating the mobility of the WTRUs 1202a, 1202b, 1202c between the RAN 1204 and the other ASNs. The communication link between the core network 1206 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

CONCLUSION

Embodiments

In an embodiment, a method for communicating over a channel may include obtaining, at a secondary transmitter, first and second signals intended for primary and secondary receivers, respectively.

In an embodiment, the method may further include generating, at the secondary transmitter, an assist signal based, at least in part, on the obtained first signal.

In an embodiment, the method may further include generating, at the secondary transmitter, a data signal based, at least in part, on the obtained second signal.

In an embodiment, the method may further include determining, at the secondary transmitter, a power split ratio between the data signal and the assist signal based, at least in part, on any of a power and a signal-to-noise ratio of the first signal. In an embodiment, the method may further include generating, at the secondary transmitter, a third signal comprising (i) the data signal and (ii) the assist signal in accordance with power split ratio.

In at least one of the preceding embodiments, the method may further include transmitting the third signal from the secondary transmitter towards the primary and secondary receivers.

In at least one of the preceding embodiments, the method may further include transmitting the third signal from the secondary transmitter towards the primary and secondary receivers responsive to (e.g., detecting and/or overhearing a transmission of) the first signal.

In at least one of the preceding embodiments, transmitting the third signal may include: transmitting the third signal from the secondary transmitter so as to satisfy an equalization capability of the primary receiver. In at least one of the preceding embodiments, transmitting the third signal may include: transmitting the third signal from the secondary transmitter so as to satisfy an equalization capability of the primary receiver while eliminating a need for auxiliary mechanisms for determining when to send the third signal.

In at least one of the preceding embodiments, transmitting the third signal from the secondary transmitter so as to satisfy an equalization capability of the primary receiver may include: transmitting the third signal at a delay from a transmission of the first signal, wherein the delay is based, at least in part, on a symbol interval.

In at least one of the preceding embodiments, the delay include an integer multiple of the symbol interval and a combination of an integer multiple of the symbol interval and a non-integer multiple of the symbol interval.

In at least one of the preceding embodiments, the method may include estimating an interference signal.

In at least one of the preceding embodiments, generating a data signal may include: generating the data signal based, at least in part, on the obtained second signal and the interference signal.

In at least one of the preceding embodiments, estimating an interference signal may include: estimating, at the secondary transmitter, an interference to occur at the secondary receiver in response to the first and third signals.

In at least one of the preceding embodiments, estimating an interference signal may include: estimating the interference signal based, at least in part, on channel state information ("CSI"). In at least one of the preceding embodiments, the CSI may be received from the secondary receiver.

In at least one of the preceding embodiments, the CSI may include any of (i) a first channel gain estimate for a channel between the secondary receiver and the primary transmitter, and (ii) a second channel gain estimate for a channel between the secondary receiver node and the secondary transmitter.

In at least one of the preceding embodiments, generating the data signal based, at least in part, on the obtained second signal and the interference signal may include: precoding the obtained second signal based, at least in part, on the interference signal.

In at least one of the preceding embodiments, Tomlinson-Harashima precoding may be used to precode the obtained second symbol.

In at least one of the preceding embodiments, generating the third signal may include: applying a weight to the data signal in accordance with the power split ratio. In at least one of the preceding embodiments, the weight may be, include or be based on a time varying value.

In at least one of the preceding embodiments, the weight may be based, at least in part, on frequency.

In at least one of the preceding embodiments, generating the assist signal may include: generating the assist signal based, at least in part, on the obtained first signal and noise.

In at least one of the preceding embodiments, the noise may be, include or be based noise accompanying the received first signal.

In at least one of the preceding embodiments, the method may include estimating, at the secondary transmitter, degradation in the first signal to occur at the primary receiver responsive to the second signal.

In at least one of the preceding embodiments, determining the power split ratio may include: determining the power split ratio based, at least in part, on (i) any of a power and a signal-to-noise ratio of the first signal transmitted from a primary transmitter, and (ii) the estimated degradation in the first signal.

In at least one of the preceding embodiments, estimating the degradation in the first signal may include: estimating an error rate to occur at the primary receiver responsive to the second signal.

In at least one of the preceding embodiments, the error rate may be a bit error rate.

In at least one of the preceding embodiments, the method may include detecting, at the secondary transmitter, a transmission of the first signal from the primary transmitter.

In an embodiment, a method for communicating over a channel may include obtaining, at a secondary transmitter, first and second symbols intended for primary and secondary receivers, respectively; and detecting, at the secondary transmitter, a first signal.

In an embodiment, the method may further include performing precoding on the second symbol based, at least in part, on an estimated interference signal so as to form a precoded data signal.

In an embodiment, the method may further include generating, at the secondary transmitter, a third signal comprising (i) the precoded data signal and (ii) an assist signal based, at least in part, on the obtained first symbol.

In at least one of the preceding embodiments, the method may include determining, at the secondary transmitter, a power split ratio between the data signal and the assist signal based, at least in part, on a power of the first signal, wherein generating an third signal may include: generating the third signal including (i) the precoded data signal and (ii) the assist signal in accordance with power split ratio.

In at least one of the preceding embodiments, the method may include transmitting the third signal from the secondary transmitter towards the primary and secondary receivers responsive to (e.g., detecting and/or overhearing a transmission of) the first signal.

In at least one of the preceding embodiments, transmitting the third signal may include: transmitting the second signal from the second transmitter so as to satisfy an equalization capability of the primary receiver.

In at least one of the preceding embodiments, transmitting the third signal from the second transmitter so as to satisfy an equalization capability of the primary receiver may include: transmitting the third signal at a delay from a transmission of the first signal, wherein the delay is based, at least in part, on a symbol interval.

In at least one of the preceding embodiments, the symbol interval may include and/or be an integer multiple of the symbol interval and a combination of an integer multiple of the symbol interval and a non-integer multiple of the symbol interval.

In at least one of the preceding embodiments, transmitting the third signal from the second transmitter so as to satisfy an equalization capability of the primary receiver may include: transmitting the third signal at a delay from a transmission of the first signal, wherein the delay may be based, at least in part, on at least a portion of a demodulation delay.

In at least one of the preceding embodiments, the demodulation delay may correspond to an amount of time for the secondary transmitter to determine the first signal (for example, if demodulation is used to determine and/or obtain the first signal).

In at least one of the preceding embodiments, the demodulation delay may correspond to an amount of time for the secondary transmitter to detect a transmission of the first signal (for example, if demodulation is not used to determine and/or obtain the first signal).

In at least one of the preceding embodiments, transmitting the third signal from the secondary transmitter so as to satisfy an equalization capability of the primary receiver may include transmitting the third signal at a delay from a transmission of the first signal, wherein the delay may be a combination of at least a portion of a demodulation delay and an additional amount of time.

In at least one of the preceding embodiments, the demodulation delay may correspond to an amount of time for the secondary transmitter to determine and/or obtain the first signal.

In at least one of the preceding embodiments, the demodulation delay may correspond to an amount of time for the secondary transmitter to detect a transmission of the first signal.

In at least one of the preceding embodiments, the method may include estimating an interference signal.

In at least one of the preceding embodiments, estimating an interference signal may include: estimating, at the secondary transmitter, an interference signal to occur at the secondary receiver in response to the first and third signals.

In at least one of the preceding embodiments, estimating an interference signal may include: estimating the interference signal based, at least in part, on CSI.

In at least one of the preceding embodiments, the CSI may be received from the secondary receiver; and wherein the CSI may include (i) a first channel gain estimate for a channel between the secondary receiver and the primary transmitter, and (ii) a second channel gain estimate for a channel between the secondary receiver node and the secondary transmitter.

In at least one of the preceding embodiments, performing precoding on the second signal may include: performing precoding on the second signal using Tomlinson-Harashima precoding.

In an embodiment, a method may include receiving a first signal from a first transmitter at a second transmitter; estimating an interference signal; and generating a second signal that may include (i) a precoded signal based, at least in part, on the estimated interference signal and a data sequence, and (ii) a signal based on the received first signal.

In at least one of the preceding embodiments, receiving a first signal may include: receiving the first signal over a wireless interface.

In an embodiment, a method for communicating over a channel may include obtaining, at a secondary transmitter, first and second signals intended for primary and secondary receivers, respectively.

In an embodiment, the method may further include detecting, at the secondary transmitter, a copy of the first signal transmitted from a primary transmitter.

In an embodiment, the method may further include, responsive to the copy of the first signal, performing precoding on the second signal based, at least in part, on an estimated interference signal so as to form a precoded data signal.

In an embodiment, the method may further include generating, at the secondary transmitter, a third signal comprising (i) the precoded data signal and (ii) an assist signal based, at least in part, on the obtained first signal.

In at least one of the preceding embodiments, the method may further include determining, at the secondary transmitter, a power split ratio between the data signal and the assist signal based, at least in part, on a power of the first signal transmitted from the primary transmitter.

In at least one of the preceding embodiments, generating a third signal may include generating the third signal comprising (i) the precoded data signal and (ii) the assist signal in accordance with power split ratio.

In at least one of the preceding embodiments, the method may further include transmitting the third signal from the secondary transmitter towards the primary and secondary receivers.

In at least one of the preceding embodiments, transmitting the third signal may include transmitting the third signal from the second transmitter so as to satisfy an equalization capability of the primary receiver.

In at least one of the preceding embodiments, transmitting the third signal from the second transmitter so as to satisfy an equalization capability of the primary receiver may include transmitting the third signal at a delay from a transmission of the first signal, wherein the delay is based, at least in part, on at least a portion of a demodulation delay.

In at least one of the preceding embodiments, the demodulation delay may correspond to an amount of time for the secondary transmitter to determine the first signal.

In at least one of the preceding embodiments, the demodulation delay may correspond to an amount of time for the secondary transmitter to detect a transmission of the first signal.

In at least one of the preceding embodiments, transmitting the third signal from the secondary transmitter so as to satisfy an equalization capability of the primary receiver may include transmitting the third signal at a delay from a transmission of the first signal, wherein the delay comprises a combination of at least a portion of a demodulation delay and an additional amount of time.

In at least one of the preceding embodiments, the demodulation delay may correspond to an amount of time for the secondary transmitter to determine the first signal.

In at least one of the preceding embodiments, the demodulation delay may correspond to an amount of time for the secondary transmitter to detect a transmission of the first signal.

In at least one of the preceding embodiments, the method may further include estimating an interference signal.

In at least one of the preceding embodiments, estimating an interference signal may include any of (i) estimating, at the secondary transmitter, an interference signal to occur at the secondary receiver in response to the first and third signals; and (ii) estimating the interference signal based, at least in part, on CSI.

In at least one of the preceding embodiments, the CSI may be received from the secondary receiver, and the CSI may include (i) a first channel gain estimate for a channel between the secondary receiver and the primary transmitter, and (ii) a second channel gain estimate for a channel between the secondary receiver node and the secondary transmitter.

In at least one of the preceding embodiments, performing precoding on the second symbol may include performing precoding on the second signal using any of Tomlinson-Harashima precoding and weighted precoding.

An apparatus, which may include any of receiver, transmitter and processor, configured to perform a method as in at least one of the preceding embodiments.

A system, which may include any of PU and SU devices, configured to perform a method as in at least one of the preceding embodiments.

A tangible computer readable storage medium having stored thereon computer executable instructions for performing a method as in at least one of the preceding embodiments.

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method, implemented in a secondary transmitter, for communicating over a channel, the method comprising:
   receiving, via a wireless spectrum, a first signal transmitted from a primary transmitter for one or more primary receivers, wherein the first signal comprises a codeword; and
   after a delay not exceeding a duration of the entire codeword, transmitting an output signal comprising an assist part and a data part, wherein:
       the assist part is a copy of the received first signal;
       the data part comprises a second signal intended for one or more secondary receivers;
   transmit power of the output signal is split between the assist and data parts based a power split ratio; and
   the power split ratio is based, at least in part, on any of a power and a signal-to-noise ratio of the first signal.

2. The method of claim 1, wherein the output signal is transmitted towards the primary and secondary receivers.

3. The method of claim 1, further comprising:
   converting the received first signal to a baseband signal, wherein transmitting the output signal after a delay not exceeding a duration of the entire codeword comprises:
       transmitting the output signal after a delay of at least one sampling period of the baseband signal.

4. The method of claim 1, wherein transmitting the output signal after a delay not exceeding a duration of the entire codeword comprises:
   transmitting a symbol of the output signal after a delay of at least one symbol period after receiving a corresponding symbol of the first signal.

5. The method of claim 1, wherein generating the output signal comprises: applying a weight to the data part in accordance with the power split ratio.

6. The method of claim 1, wherein transmitting the output signal after a delay not exceeding a duration of the entire codeword comprises:
   transmitting the output signal after a delay that is less than the duration of the entire codeword and that enables delay diversity at one or more of the primary receivers in connection with the first and output signals.

7. The method of claim 1, further comprising:
   generating the output signal in accordance with the power split ratio.

8. The method of claim 1, further comprising:
   estimating an interference signal; and
   generating the data part based, at least in part, on the second signal and the interference signal.

9. The method of claim 8, wherein estimating an interference signal comprises: any of (i) estimating, at the secondary transmitter, an interference to occur at the secondary receiver in response to the first and output signals; and (ii) estimating the interference signal based, at least in part, on channel state information.

10. The method of claim 9, wherein the channel state information is received from the secondary receiver; and wherein the channel state information comprises (i) a first channel gain estimate for a portion of the channel between the secondary receiver and the primary transmitter, and (ii) a second channel gain estimate for a portion of the channel between the secondary receiver and the secondary transmitter.

11. The method of claim 8, wherein generating the data part comprises: precoding the second signal based, at least in part, on the interference signal.

12. The method of claim 11, wherein precoding the second signal comprises: using Tomlinson-Harashima precoding to precode the second signal based, at least in part, on the interference signal.

13. The method of claim 1, further comprising: generating the assist part based, at least in part, on the received first signal and noise.

14. The method of claim 1, further comprising:
estimating, at the secondary transmitter, degradation in the first signal to occur at the primary receiver responsive to the output signal; and
determining the power split ratio based, at least in part, on (i) any of a power and a signal-to-noise ratio of the first signal transmitted from a primary transmitter, and (ii) the estimated degradation in the first signal.

15. The method of claim 14, wherein estimating degradation in the first signal comprises: estimating an error rate to occur at the primary receiver responsive to the output signal.

16. The method of claim 1, further comprising: generating the output signal based, at least in part, on radio signal type of the primary transmitter.

17. The method of claim 16, wherein generating the output signal based, at least in part, on radio signal type of the primary transmitter comprises:
retrieving, from a database, parameters of the radio signal type of primary transmitter, and
generating the output signal based, at least in part, on the retrieved parameters.

18. The method of claim 17, wherein the parameters comprise any of a carrier frequency, bandwidth, modulation scheme and synchronization sequence.

19. An apparatus comprising a receiver, a transmitter and a processor in communication with the receiver and transmitter, wherein:
the receiver is configured to receive a first signal intended for one or more primary receivers; and
after a delay not exceeding a duration of the entire codeword, the transmitter is configured to transmit an output signal comprising an assist part and a data part, wherein:
the assist signal part is a copy of the received first signal;
the data part comprises a second signal intended for one or more secondary receivers;
transmit power of the output signal is split between the assist and data parts based a power split ratio; and
the power split ratio is based, at least in part, on any of a power and a signal-to-noise ratio of the first signal.

20. The apparatus of claim 19, wherein the transmitter is configured to transmit the output signal towards the primary and secondary receivers.

21. The apparatus of claim 19, wherein:
the processor is configured to convert the received first signal to a baseband signal; and
the transmitter is configured to transmit the output signal after a delay of at least one sampling period of the baseband signal.

22. The apparatus of claim 19, wherein the transmitter is configured to transmit the output signal a symbol of the output signal after a delay of at least one symbol period after receiving a corresponding symbol of the first sign.

23. The apparatus of claim 19, wherein the transmitter is configured to transmit the output signal after a delay that is less than the duration of the entire codeword and that enables delay diversity at one or more of the primary receivers in connection with the first and output signals.

24. The apparatus of claim 19, wherein the processor is configured to estimate an interference signal, and wherein the transmitter is configured to generate the data part based, at least in part, on the second signal and the interference signal.

25. The apparatus of claim 24, wherein the processor is configured to estimate the interference signal based, at least in part, on any of (i) an interference to occur at the secondary receiver in response to the first and output signals, and (ii) channel state information.

26. The apparatus of claim 25, wherein the receiver is configured to receive the channel state information from the secondary receiver; and wherein the channel state information comprises (i) a first channel gain estimate for a portion of the channel between the secondary receiver and the primary transmitter, and (ii) a second channel gain estimate for a portion of the channel between the secondary receiver and the secondary transmitter.

27. The apparatus of claim 24, wherein the transmitter is configured to precode the second signal based, at least in part, on the interference signal.

28. The apparatus of claim 27, wherein the transmitter is configured to use Tomlinson-Harashima precoding to precode the second signal.

29. The apparatus of claim 19, wherein the transmitter is configured to apply a weight to the data part in accordance with the power split ratio when generating the output signal.

30. The apparatus of claim 19, wherein the assist part is generated based, at least in part, on the received first signal and noise.

31. The apparatus of claim 19, wherein the processor is configured to estimate degradation in the first signal to occur at the primary receiver responsive to the output signal, and wherein the processor is configured to determine the power split ratio based, at least in part, on (i) any of a power and a signal-to-noise ratio of the first signal transmitted from a primary transmitter, and (ii) the estimated degradation in the first signal.

32. The apparatus of claim 31, wherein the processor is configured to estimate an error rate to occur at the primary receiver responsive to the output signal, and to use the error rate for estimating degradation in the first signal.

33. The apparatus of claim 19, wherein the transmitter is configured to generate the output signal based, at least in part, on radio signal type of the primary transmitter.

34. The apparatus of claim 33, wherein:
the processor is configured to retrieve, from a database, parameters of the radio signal type of primary transmitter, and
the transmitter is configured to generate the output signal based, at least in part, on the retrieved parameters.

35. The apparatus of claim 34, wherein the parameters comprise any of a carrier frequency, bandwidth, modulation scheme and synchronization sequence.

* * * * *

UNITED STATES PATENT AND TRADEMARK OFFICE
CERTIFICATE OF CORRECTION

PATENT NO.        : 9,054,760 B2                                  Page 1 of 1
APPLICATION NO.   : 13/622145
DATED             : June 9, 2015
INVENTOR(S)       : Liangping Ma et al.

It is certified that error appears in the above-identified patent and that said Letters Patent is hereby corrected as shown below:

In the Claims

In claim 5, at column 28, line 48, the clause "The method of claim 1" should be replaced with --The method of claim 4--.

In claim 19, at column 29, line 54, the term "signal" immediately following the term "assist" should be deleted.

In claim 22, at column 30, line 7, the term "sign" should be replaced with --signal--.

Signed and Sealed this
Ninth Day of February, 2016

Michelle K. Lee
*Director of the United States Patent and Trademark Office*